US012270309B2

(12) United States Patent
Unton et al.

(10) Patent No.: US 12,270,309 B2
(45) Date of Patent: Apr. 8, 2025

(54) VARIABLE STATOR VANE ASSEMBLY WITH MAGNETIC ACTUATION ROTOR FOR GAS TURBINE ENGINES

(71) Applicant: Rolls-Royce North American Technologies Inc., Indianapolis, IN (US)

(72) Inventors: Timothy Unton, Noblesville, IN (US); Andrew Eifert, Indianapolis, IN (US); Michael Moser, Brownsburg, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 68 days.

(21) Appl. No.: 18/048,609

(22) Filed: Oct. 21, 2022

(65) Prior Publication Data

US 2024/0133313 A1 Apr. 25, 2024
US 2024/0229673 A9 Jul. 11, 2024

(51) Int. Cl.
*F01D 17/16* (2006.01)
*F04D 29/56* (2006.01)

(52) U.S. Cl.
CPC ......... *F01D 17/162* (2013.01); *F04D 29/563* (2013.01); *F05D 2240/12* (2013.01)

(58) Field of Classification Search
CPC .. F01D 17/162; F04D 29/563; F05D 2270/62; F05D 2240/12; H02K 1/185; H02K 1/187; H02K 1/279; H02K 1/2786
See application file for complete search history.

(56) References Cited

U.S. PATENT DOCUMENTS 3,397,836 A 8/1968 Badger et al.
3,887,297 A 6/1975 Welcheck
3,914,066 A 10/1975 Downing
5,044,879 A 9/1991 Farrar
5,096,374 A * 3/1992 Sakai .................. F04D 29/4213 415/150
5,993,152 A 11/1999 Schilling
7,393,178 B2 7/2008 Bouru
7,413,401 B2 8/2008 Szucs et al.
(Continued)

FOREIGN PATENT DOCUMENTS

DE 102014001034 A1 * 7/2015 ........... F01D 17/162
WO WO-2014205816 A1 * 12/2014 ........... F01D 17/162

OTHER PUBLICATIONS

Schellhorn, Machine Translation of DE102014001034, 2015 (Year: 2015).*

*Primary Examiner* — Michael K. Reitz
(74) *Attorney, Agent, or Firm* — Barnes & Thornburg LLP

(57) ABSTRACT

A vane assembly includes a casing, vanes, and an actuator assembly. The vanes are arranged within the casing and are rotatably coupled to the casing for rotation relative thereto and configured to rotate about their pitch axes. The actuator assembly is arranged radially outward of the casing and includes an annular ring surrounding the casing and coupled to the vanes, a magnet arranged on the ring, and a stator spaced apart from the magnet. The ring is configured to rotate the vanes about their pitch axes in response to rotation of the ring about the central axis and the stator is configured to selectively rotate the magnet and ring about the central axis. The stator is configured to create a magnetic field which causes annular movement of the ring via interaction with the magnet.

16 Claims, 9 Drawing Sheets

(56) References Cited

U.S. PATENT DOCUMENTS

| | | | | |
|---|---|---|---|---|
| 7,898,134 | B1 * | 3/2011 | Shaw | H02K 21/222 310/112 |
| 8,066,474 | B1 | 11/2011 | Jansen et al. | |
| 8,204,671 | B2 | 6/2012 | Agrawal et al. | |
| 8,297,918 | B2 | 10/2012 | Bhatnagar | |
| 8,333,546 | B2 | 12/2012 | Colotte et al. | |
| 8,393,857 | B2 | 3/2013 | Copeland et al. | |
| 8,641,367 | B2 | 2/2014 | Norris et al. | |
| 8,727,697 | B2 | 5/2014 | Eifert | |
| 8,740,547 | B2 | 6/2014 | Colotte et al. | |
| 9,103,228 | B2 | 8/2015 | Waugh et al. | |
| 9,885,291 | B2 | 2/2018 | Lecordix et al. | |
| 10,288,079 | B2 | 5/2019 | Skertic | |
| 10,301,962 | B2 | 5/2019 | Chandler et al. | |
| 10,443,431 | B2 | 10/2019 | Suciu et al. | |
| 10,458,271 | B2 | 10/2019 | Chandler et al. | |
| 10,508,660 | B2 | 12/2019 | Hall et al. | |
| 10,626,747 | B2 | 4/2020 | Karapurath | |
| 10,634,000 | B2 | 4/2020 | Skertic et al. | |
| 10,662,804 | B2 | 5/2020 | Awtry et al. | |
| 10,794,281 | B2 | 10/2020 | Nestico et al. | |
| 10,815,802 | B2 | 10/2020 | Prasad | |
| 10,927,699 | B2 | 2/2021 | Bromann et al. | |
| 11,131,323 | B2 | 9/2021 | Suciu et al. | |
| 11,371,380 | B2 | 6/2022 | Poick | |
| 2005/0147492 | A1 | 7/2005 | Mahoney et al. | |
| 2007/0280821 | A1 * | 12/2007 | Herrmann | F01D 17/24 415/159 |
| 2008/0025837 | A1 * | 1/2008 | Lejars | F01D 17/162 415/161 |
| 2009/0297334 | A1 | 12/2009 | Norris et al. | |
| 2010/0014977 | A1 | 1/2010 | Shattuck | |
| 2010/0058817 | A1 * | 3/2010 | Yoshikawa | H02K 21/222 68/139 |
| 2016/0138415 | A1 * | 5/2016 | Poisson | F01D 21/003 415/10 |
| 2017/0292400 | A1 * | 10/2017 | Bifulco | F01D 17/085 |
| 2019/0372408 | A1 * | 12/2019 | Taniguchi | H02K 1/279 |
| 2020/0088108 | A1 | 3/2020 | Klein et al. | |
| 2024/0229672 | A9 * | 7/2024 | Unton | F01D 17/14 |

* cited by examiner

VARIABLE STATOR VANE ASSEMBLY WITH MAGNETIC ACTUATION ROTOR FOR GAS TURBINE ENGINES

FIELD OF THE DISCLOSURE

The present disclosure relates generally to gas turbine engines, and more specifically to variable vane assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include vane assemblies arranged within the engine components, such as inlet guide vanes and stator vanes. To provide for the necessary stall or surge margin at different power settings throughout operation of the gas turbine engine, variable, or adjustable, vanes may be utilized, such as variable inlet guide vanes and/or variable stator vanes.

SUMMARY

The present disclosure may comprise one or more of the following features and combinations thereof.

According to a first aspect of the present disclosure, a vane assembly for a gas turbine engine includes a casing, a first plurality of vanes, and a first actuator assembly. The casing surrounds a central axis of the gas turbine engine. The first plurality of vanes is arranged within the casing and extending radially outward relative to the central axis, each vane being rotatably coupled to the casing for rotation relative thereto and configured to rotate about a first vane pitch axis that extends radially relative to the central axis.

The first actuator assembly is arranged radially outward of the casing and including a first annular ring surrounding the casing and coupled to at least one first vane of the first plurality of vanes, a first magnet arranged on the first annular ring, and a first stator spaced apart from the first magnet and configured to electromagnetically interact with the first magnet. The first annular ring is configured to rotate the at least one first vane about the corresponding first vane pitch axis in response to rotation of the first annular ring about the central axis and the first stator is configured to selectively rotate the first magnet and first annular ring about the central axis. The first stator is configured to create a magnetic field which causes annular movement of the first annular ring via interaction with the first magnet.

In some embodiments, the first annular ring is coaxial with the first plurality of vanes and extends entirely around the casing.

In some embodiments, the first actuator assembly includes a plurality of first magnets which includes the first magnet.

In some embodiments, the first stator is axially aligned with the plurality of first magnets.

In some embodiments, an axial extent of the first stator is greater than an axial extent of each first magnet of the plurality of first magnets.

In some embodiments, the first stator is arranged radially outward of the plurality of first magnets.

In some embodiments, the first stator is arranged radially inward of the plurality of first magnets.

In some embodiments, the first actuator assembly further includes a plurality of second magnets arranged radially inward and spaced apart from the plurality of first magnets. The first stator is arranged radially between the plurality of first magnets and the plurality of second magnets. An axial extent of the first stator is greater than an axial extent of each second magnet of the plurality of second magnets.

In some embodiments, the first stator is radially aligned with the plurality of first magnets.

In some embodiments, the first stator is arranged axially aft of the plurality of first magnets and is spaced apart from the first annular ring.

In some embodiments, the first actuator assembly further includes a plurality of second magnets axially spaced apart from the plurality of first magnets. The first actuator assembly further includes a second stator that is radially aligned with the plurality of first magnets and the plurality of second magnets. The second stator is arranged axially forward of the plurality of second magnets and is spaced apart from the first annular ring.

In some embodiments, the assembly further includes a second plurality of vanes and a second actuator assembly. The second plurality of vanes is axially spaced apart from the first plurality of vanes and extending radially outward relative to a central axis of the gas turbine engine, each vane of the second plurality of vanes configured to rotate about a second vane pitch axis that extends radially relative to the central axis.

The second actuator assembly is arranged radially outward of the casing and including a second annular ring surrounding the casing and coupled to at least one second vane of the second plurality of vanes, a second magnet arranged on the second annular ring, and a second stator arranged adjacent the second magnet and configured to electromagnetically interact with the second magnet. The second annular ring is configured to rotate the at least one second vane about the corresponding second vane pitch axis in response to rotation of the second annular ring about the central axis and the second stator is configured to selectively rotate the second magnet and second annular ring about the central axis.

In some embodiments, the at least one first vane is configured to rotate to a first rotational position, and the at least one second vane is configured to rotate to a second rotational position.

In some embodiments, the second rotational position is different than the first rotational position.

According to a further aspect of the present disclosure, a vane assembly for a gas turbine engine includes a first plurality of vanes and a first actuator assembly. The first plurality of vanes is configured to each rotate about a first vane pitch axis, and the first actuator assembly includes a first annular ring coupled to the first plurality of vanes, a first magnet arranged on the first annular ring, and a first stator spaced apart from the first magnet.

The first annular ring is configured to rotate at least one first vane of the first plurality of vanes about the corresponding first vane pitch axis in response to rotation of the first annular ring about the central axis and the first stator is configured to selectively rotate the first magnet and first annular ring about the central axis, and the first stator is configured to create a magnetic field which causes annular movement of the first annular ring via interaction with the first magnet.

In some embodiments, the first stator is axially aligned with the first magnet.

In some embodiments, the first stator is arranged radially outward of the plurality of first magnets.

In some embodiments, the first stator is arranged radially inward of the plurality of first magnets.

In some embodiments, the first actuator assembly further includes a second magnet arranged radially inward and spaced apart from the first magnet, and the first stator is arranged radially between the first magnet and the second magnet.

A method according to a further aspect of the present disclosure includes providing a first plurality of vanes extending radially outward relative to a central axis of a gas turbine engine, each vane configured to rotate about a first vane pitch axis that extends radially relative to the central axis, providing a first actuator assembly including a first annular ring, a first magnet, and a first stator, and arranging the first annular ring radially outward of the first plurality of vanes.

In some embodiments, the method further includes coupling the first annular ring to at least one first vane of the first plurality of vanes, arranging the first magnet on the first annular ring, and arranging the first stator in spaced apart relation to the first magnet, the first stator configured to electromagnetically interact with the first magnet, wherein the first annular ring is configured to rotate the at least one first vane about the corresponding first vane pitch axis in response to rotation of the first annular ring about the central axis and the first stator is configured to selectively rotate the first magnet and first annular ring about the central axis. The first stator is configured to create a magnetic field which causes annular movement of the first annular ring via interaction with the first magnet.

These and other features of the present disclosure will become more apparent from the following description of the illustrative embodiments.

DETAILED DESCRIPTION OF THE DRAWINGS

Figure 1:
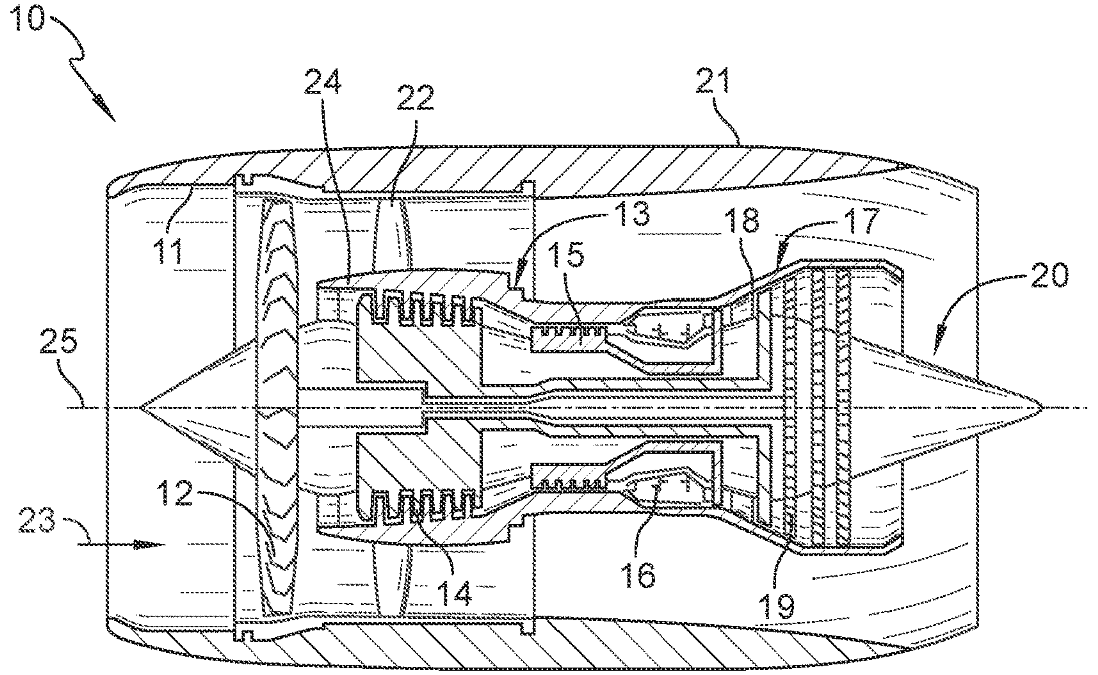
FIG. 1 is a cutaway view of a gas turbine engine with which a vane assembly according to the present disclosure may be utilized, showing that the gas turbine engine includes a propulsive fan, an engine core including a compressor, a combustor, and a turbine configured to drive the first propulsive fan, and a bypass duct surrounding the engine core.

For the purposes of promoting an understanding of the principles of the disclosure, reference will now be made to a number of illustrative embodiments illustrated in the drawings and specific language will be used to describe the same.

The present disclosure is related to vane assemblies 110, 210, 310, 410, 510, 610 configured to be utilized in a gas turbine engine 10, in particular vane assemblies including an actuator assembly 112, 212, 312, 412, 512, 612 configured to rotate a plurality of variable vanes 130, 230, 330, 430, 530, 630. In the illustrative embodiments, the actuator assembly 112, 212, 312, 412, 512, 612 includes an electric motor assembly 140, 240, 340, 440, 540 including a combination of at least one rotor 144, 244, 344, 444, 544 and at least one stator 150, 250, 350, 450, 550 that are configured to electromagnetically control rotation of the plurality of variable vanes 130, 230, 330, 430, 530, 630 of the vane assemblies 110, 210, 310, 410, 510, 610. A person skilled in the art will understand that the disclosed vane assemblies 110, 210, 310, 410, 510, 610 may be utilized in any type of engine similar to a gas turbine engine or any turbomachinery including vanes.

Illustratively, the rotor 144, 244, 344, 444, 544 is arranged on or within a unison ring, or annular ring 114, 214, 314, 414, 514 that surrounds the corresponding plurality of variable vane stage. By making the entire large diameter annular ring 114, 214, 314, 414, 514, the rotor portion of the electric motor assembly 140, 240, 340, 440, 540 can be lightweight and easy to install, minimize the torque required to rotate the variable vanes of the plurality of variable vanes 130, 230, 330, 430, 530, and enable individual stage control of each stage of vanes.

Figure 4B:
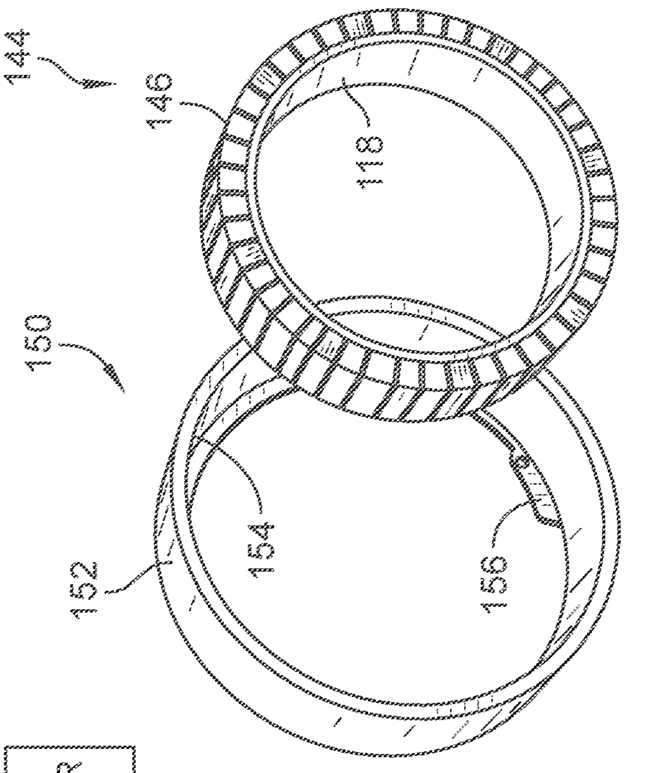
FIG. 4B is a perspective view of the stator and rotor of the electric motor assembly of FIG. 4A.
Figure 4A:
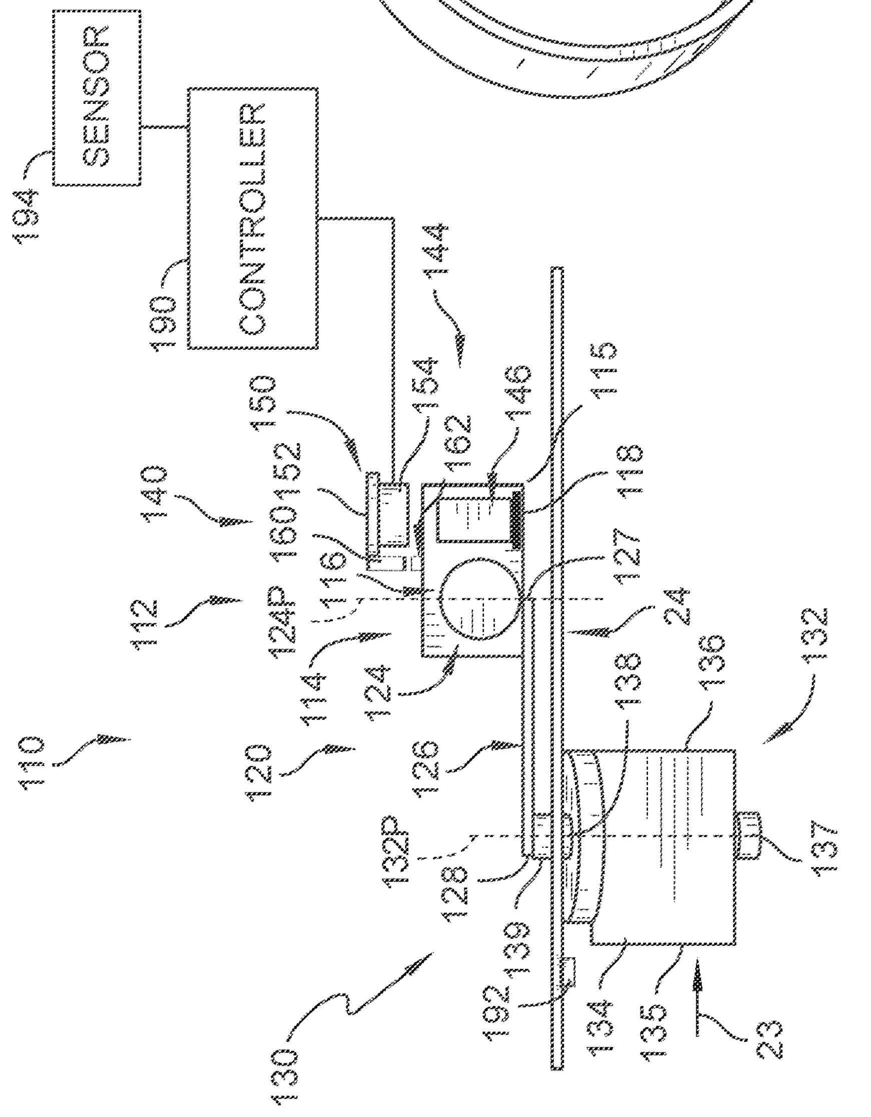
FIG. 4A is a cross-sectional view of a vane assembly according to a first aspect of the present disclosure, showing that the vane assembly includes a plurality of variable vanes and an electric motor assembly including a rotor arranged to move annularly with an annular ring surrounding the plurality of vanes and a stator, showing that the annular ring is coupled to the plurality of vanes, showing that the stator is configured to annularly move the annular ring which rotates each variable vane of the plurality of vanes, and showing that the stator is axially aligned with the rotor and arranged radially outward of the rotor.

A vane assembly 110 according to a first aspect of the present disclosure is shown in FIGS. 4A and 4B. In an illustrative embodiment, the vane assembly 110 is configured to be utilized in a turbofan gas turbine engine 10, as shown in FIG. 1. The exemplary gas turbine engine 10 includes an inlet 11, a fan 12, an engine core including a compressor 13 having an inter-stage compressor section 14 and a compressor discharge section 15, a combustor 16, and a turbine 17 having a high-pressure turbine 18 and a low-pressure turbine 19. The fan 12 is driven by the turbine 17 and provides thrust for forwardly propelling an aircraft on which the gas turbine engine 10 is coupled. The compressor 13 compresses and delivers air 23 to the combustor 16. The combustor 16 mixes fuel with the compressed air 23 received from the compressor 13 and ignites the fuel. The hot, high-pressure products of the combustion reaction in the combustor 16 are directed into the turbine 17 to cause the turbine 17 to rotate about an axis 25 of the gas turbine engine 10 and drive the compressor 13 and the fan 12 and exhaust remaining mixture out of the turbine 17 over an exhaust plug 20. The engine 10 may include a nacelle 21 that houses the engine components described above.

Figure 2:
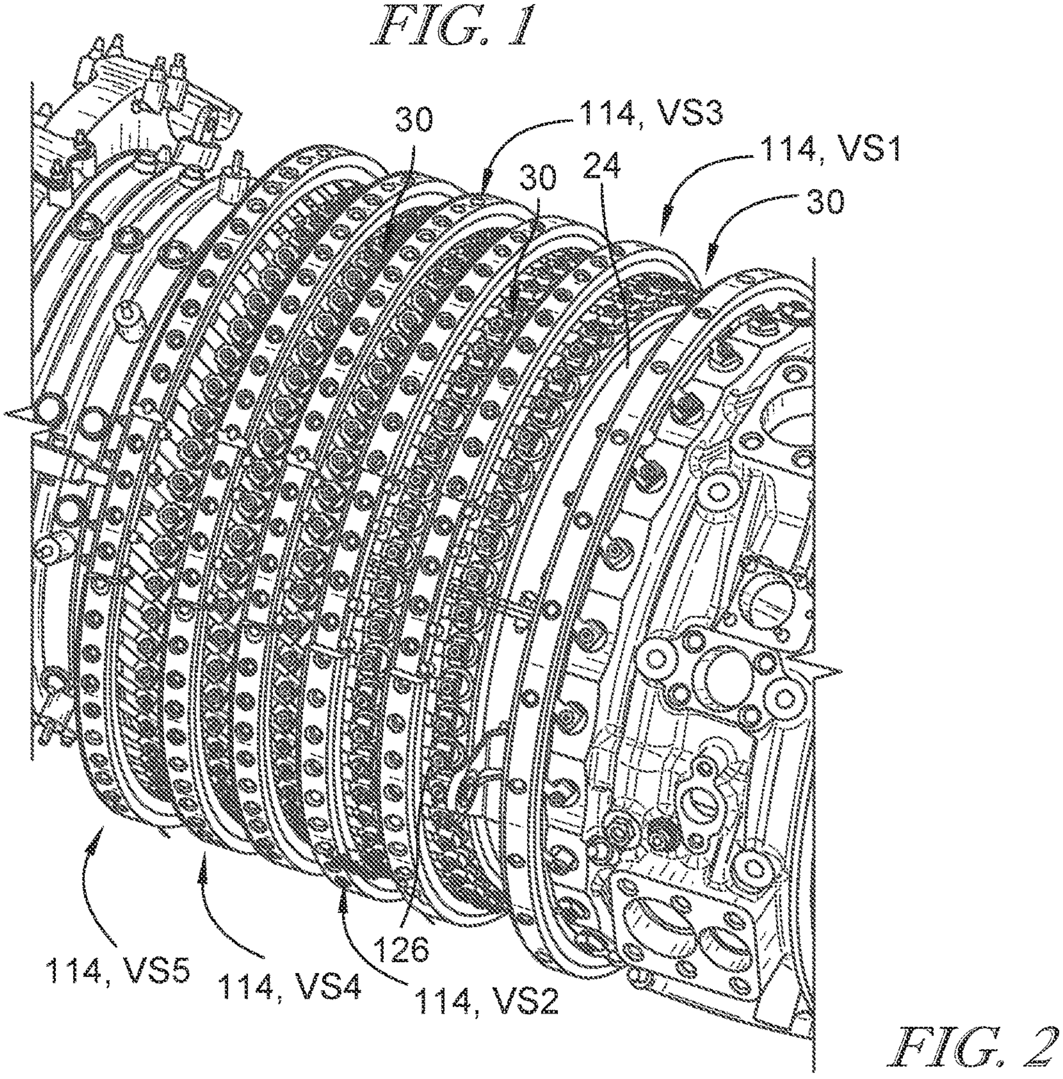
FIG. 2 is a perspective view of a compressor section of the engine of FIG. 1, showing that the engine includes multiple vane assemblies associated with adjacent vane stages of the compressor section, each vane assembly being configured to individually control an annular ring of each vane stage so as to control the plurality of variable vanes of each vane stage.

The engine 10 includes a casing 24, which may be formed as a single component or multiple cojoined components, that surrounds the various sections of the engine 10, including the compressor 13, the combustor 16, and the turbine 17. Illustratively, the compressor 13 and/or turbine 17 sections may include multiple stages of a plurality of vanes 30 arranged between stages of bladed rotors, as shown in FIG. 2. In an exemplary embodiment, the compressor section 13 of the engine 10 may include multiple stages, in particular five stages as shown in FIG. 2, of pluralities of vanes 30, each surrounded by an annular ring, such as the annular ring 114 of the vane assembly 110 which will be described in greater detail below.

Figure 3:
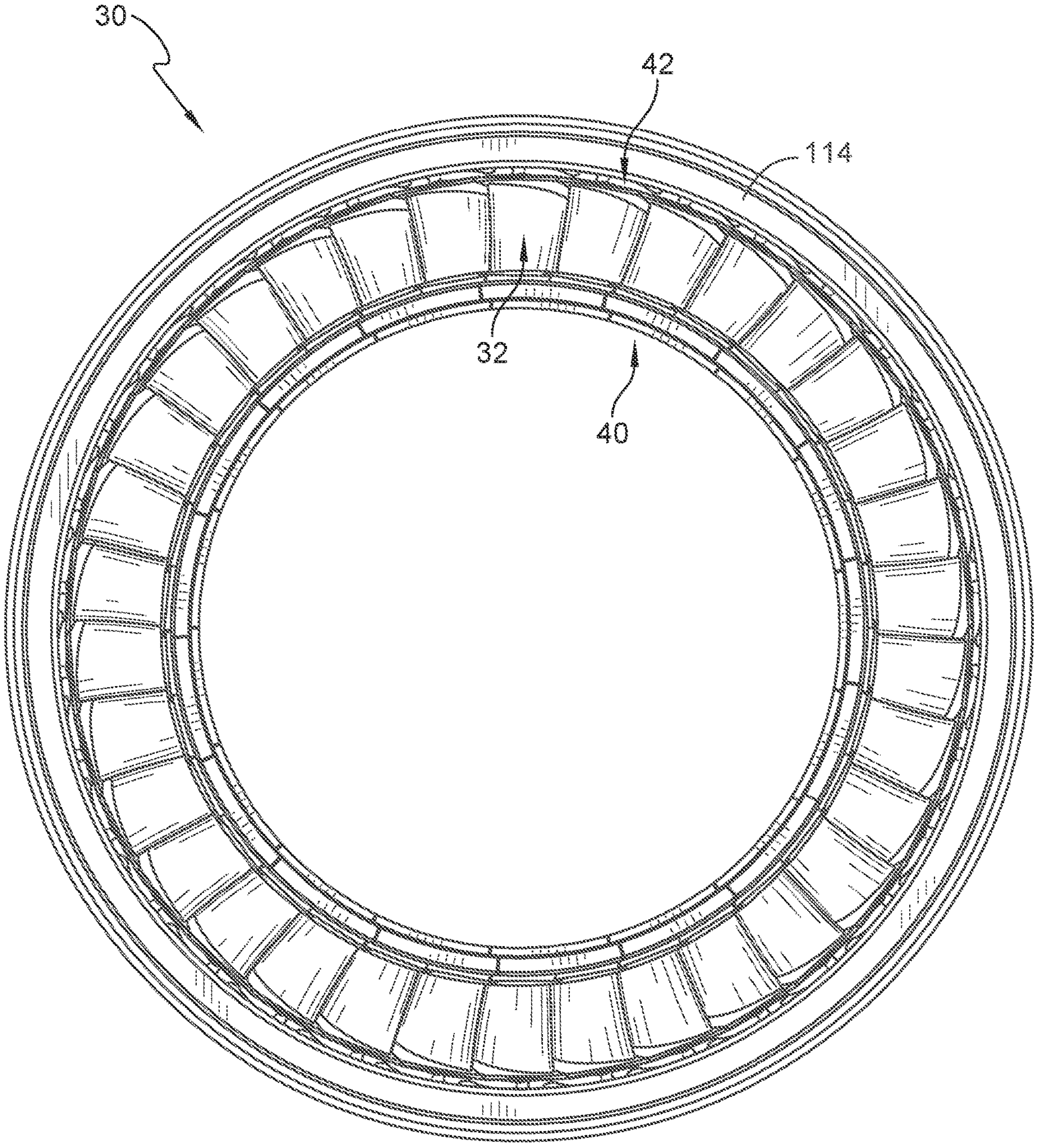
FIG. 3 is a front view of the plurality of vanes of the vane assembly of FIG. 2.

In some embodiments, the plurality of vanes 30 include individual vanes 32 having inner and outer platforms 40, 42, as shown in FIG. 3. The plurality of vanes 30 may be surrounded by an annular ring, for example the annular ring 114 of the vane assembly 110. At least some or all of the vanes 32 of the plurality of vanes 30 in some or all of the stages described above may be variable vanes that are configured to rotate so as to selectively redirect incoming air exiting an axially forward bladed rotor and subsequently onto other components of the engine 10.

In the illustrative embodiment, the vane assembly 110 is configured to be utilized in the compressor or turbine sections 13, 17 of the engine 10, although in other embodiments, a person skilled in the art could envision the vane assembly 110, or any other vane assemblies described herein, being utilized in other sections of the engine 10, such as with variable fan outlet guide vanes 22 arranged downstream of the fan 12 or inlet guide vanes arranged upstream of the fan 12.

As shown in FIG. 4A, the vane assembly 110 includes a first plurality of vanes 130 and a first actuator assembly 112 including the annular ring 114, an actuator coupling assembly 120, and an electric motor assembly 140. The first plurality of vanes 130 may be formed similarly to the vanes 30 described above, and may be utilized in the gas turbine engine 10 described above. The first plurality of vanes 130 may arranged within the casing 24. As shown in FIG. 4A, each vane 132 of the plurality of vanes 130 extends radially outward relative to the central axis 25, and includes a vane body 134, a leading edge 136, a trailing edge 136, an inner rotation coupling 137, a casing coupling 138, and an actuator coupling 139 extending upwardly away from the casing coupling 138.

The outer rotation coupling 138 of each vane 132 may be rotatably coupled to the casing 24 for rotation relative thereto and configured to rotate about a first vane pitch axis 132P that extends radially relative to the central axis 25 and generally centrally through the vane body 134. In some embodiments, the vane 132 may be configured to rotate to a first fully closed position that is 90 degrees away, in a first circumferential direction, from a 0 degree position that is axially aligned with the central axis 25, configured to rotate to a second fully closed position that is 90 degrees away, in a second circumferential direction opposite to the first circumferential direction, from the 0 degree position, and any position therebetween.

Illustratively, the annular ring 114 is formed as a fully annular ring that is movably or slidably arranged on the casing 24 so as to move annularly relative thereto, as shown in FIG. 2. In some embodiments, the annular ring 114 may be slidably arranged on the casing 24 so as to allow for some axial play of the annular ring 114 during annular movement thereof. The annular ring 114 may be formed as a single monolithic component, or may be formed in sections that are coupled together to form the fully annular ring. As can be seen in FIG. 2 and FIG. 4A, the annular ring 114 is arranged on the casing 24 axially aft relative to the plurality of vanes 130, although a person skilled in the art will understand that, in other embodiments, the ring 114 may be arranged axially forward of the plurality of vanes 130. In some embodiments, the annular ring 114 is coaxial with the plurality of vanes 130, and more specifically, with the central axis 25.

The annular ring 114 may be formed to be at least partially hollow in some embodiments, as shown in FIG. 4A, in particular to include an interior cavity 116 defined by an outer housing 115 of the annular ring 114. The annular ring 114 may further include rotating balls or spherical bearings 124 of the actuator coupling assembly 120, and at least one magnet 146 of the at least one rotor 144 of the electric motor assembly 140, as will be described in detail below. In some embodiments, the bearings 124 may be bushings.

As shown in FIG. 2 and FIG. 4A, the actuator coupling assembly 120 includes a plurality of spherical bearings 124 and a plurality of coupling arms 126 disposed annularly around a radially outer surface of the casing 24. Each coupling arm 126 extends between and interconnects the annular ring 114 and a corresponding vane 132 of the plurality of vanes 130. Specifically, each coupling arm 126 includes a first end 127 fixedly coupled to the spherical bearing 124 and a second end 128 fixedly coupled to the actuator coupling 139 of a respective vane 132. In some embodiments, the actuator coupling assembly 120 includes a coupling arm 126 for each vane 132 of the plurality of vanes 130.

In some embodiments, the spherical bearing 124 is rotatably arranged within the interior cavity 116 of the annular ring 114 and configured to rotate about a bearing rotational axis 124P such that annular movement of the annular ring 114 causes each vane 132 to rotate via the connection between the spherical bearing 124 and the actuator coupling 139 of the vane 132. A person skilled in the art would understand that the coupling arm 126 may be rotatably coupled to the annular ring 114 in manners other than a spherical bearing 124, such as pins inserted through the first end 127 and into the outer housing wall 115 of the annular ring 114.

In order to cause the annular movement of the annular ring 114, the first actuator assembly 112 further includes the electric motor assembly 140, as shown in FIG. 4A and FIG. 4B. The electric motor assembly 140 includes a rotor 144 and a stator 150 arranged in proximity to the annular ring 114 and configured to electromagnetically interact with each other so as to annularly move the annular ring 114. Illustratively, the rotor 144 includes at least one magnet 146 arranged within the interior cavity 116 of the annular ring 114. In some embodiments, as shown in FIG. 4A and FIG. 4B, the at least one magnet 146 is arranged on an annular platform 118 that extends around the interior cavity 116, the magnet 146 extending radially outwardly away from the platform 118. The platform 118 is fixed to the outer housing wall 115 of the annular ring 114 so as to move therewith.

In some embodiments, the rotor 144 may include a single magnet 146 arranged on the platform 118, or, as shown in FIG. 4B, a plurality of magnets 146 evenly arranged around the platform 118. In other embodiments, the rotor 144 may include groups of magnets 146 arranged in sections around the annular extent of the platform 118. By way of a non-limiting example, a group of magnets 146 may be arranged at each 90 degree position around the platform 118. By way of another non-limiting example, a group of magnets 146 may be arranged at opposing 180 degree positions of the platform 118. Such arrangements may be utilized to further reduce the weight of the assembly 110 and add redundancy.

The magnets 146 may be embodied as a permanent magnet. In some embodiments, the magnets 146 may include electromagnets. In some embodiments, the magnets 146 are comprised of samarium cobalt, although other high-energy materials may be utilized in other embodiments.

The electric motor assembly 140 further includes the stator 150 spaced apart from the magnets 146 of the rotor 144 and configured to electromagnetically interact with the magnets 146, as shown in FIG. 4A. Illustratively, the stator 150 includes an annular stator platform 152 and at least one winding 154 arranged on a radially inner side of the annular stator platform 152, as shown in FIG. 4B. The annular platform 152 may further include a partial side wall 156 for axial coupling to other components of the vane assembly 110 or engine 10.

In some embodiments, the stator 150 may include a single winding 154 arranged on the platform 152, or, as shown in FIG. 4B, a plurality of windings 154 evenly arranged around the platform 152. In other embodiments, the stator 150 may include groups of windings 154 arranged in sections around the annular extent of the platform 152. By way of a non-limiting example, a group of windings 154 may be arranged at each 90 degree position around the platform 152 so as to generally align with corresponding groups of magnets 146 arranged on the platform 118, as described above. By way of another non-limiting example, a group of windings 154 may be arranged at opposing 180 degree positions of the platform 152 so as to generally align with corresponding groups of magnets 146 arranged on the platform 118, as described above. Such arrangements may be utilized to further reduce the weight of the assembly 110 and add redundancy.

In the illustrative embodiment, the annular stator platform 152 and the plurality of windings 154 are axially aligned with the annular platform 118 and the magnets 146, as shown in FIG. 4A. In some embodiments, the axial extent of the plurality of windings 154 is greater than the axial extent of the corresponding magnets 146 so as to account for small axial movements of the annular ring 114 during annular movement thereof. Illustratively, the stator 150 is also arranged radially outward of the annular ring 114, as shown in FIG. 4A.

In operation, the stator 150, in particular the windings 154 of the stator 150, are configured to create a magnetic field which causes annular movement of the annular ring 114 via interaction with the magnets 146. During annular movement, the annular ring 114 moves relative to the vane pitch axis 132P, which is fixed relative to the casing 24 via the couplings 137, 138, such that the annular movement of the annular ring 114 causes rotation of the vanes 132 about their respective vane pitch axes 132P. Thus, the annular ring 114 may move in the first circumferential direction, which turns the vanes 132 in a rotational direction that causes the leading edge 135 to move in the opposite direction as the first circumferential direction. Conversely, movement of the annular ring 114 in the second circumferential direction turns the vanes 132 in a rotational direction that causes the leading edge 135 to move in the opposite direction as the second circumferential direction.

Figure 4C:
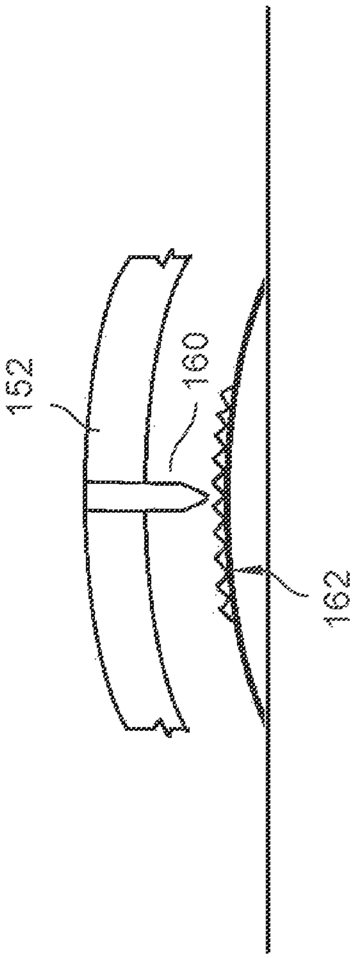
FIG. 4C is a cross-sectional view of a portion of the annular platform including the locking plunger and the plurality of teeth on the annular ring.

In some embodiments, the stator platform 152 may further include a locking plunger 160 attached thereto, as shown in FIG. 4A. The locking plunger 160 may be actuated by any mechanisms known in the art, such as via a solenoid, to lower and engage a set of teeth 162 that extend around the circumference of a top surface of the annular ring 114, as shown in FIG. 4C. When the plunger 160 engages the teeth 162, the annular ring 114, and thus the vanes 132, are locked in place, thus eliminating the stress on the annular ring 114 and the components of the electric motor assembly 140 as well as the actuator coupling assembly 120 that would be caused by having to hold the vanes 132 and the annular ring 114 in place. Moreover, continuous power and current would not have to be applied to the stator 150 in order to hold these positions. The locking plunger 160 may be connected to a controller 190, as will be described in greater detail below, which can control the locking and unlocking operations when the vanes 132 are in desired positions. In other related embodiments, the electric motor assembly 140 may include, in addition to or alternatively to the locking plunger 160, a friction brake that engages the annular ring 114 to slow or stop movement of the ring 114.

As described above, different stages of vanes each have their own unique actuator assembly 112 for rotating the respective vanes 132, and as such, different stages of vanes may be rotated to different rotational positions depending on the operating requirements of the engine 10. By way of a non-limiting example, as shown in FIG. 2, an axially forwardmost vane stage VS1 including a first plurality of vanes 130 may be rotated to a first rotational position via its corresponding annular ring 114, and a succeeding vane stage VS2 including a second plurality of vanes 130 may be rotated to a second rotational position via its corresponding annular ring 114, the first rotational position being different than the second rotational position. The various vane stages VS1, VS2, VS3, VS4, VS5 may each be rotated to unique rotational positions, or some rotational positions may overlap for multiple stages. These configurations allow for individual vane stage control, which provides for much greater precision in controlling air flow through the engine 10 as opposed to typical designs, such as those in which the various stages of vanes are ganged together and thus move together via torque tubes or the like.

In some embodiments, as will be described in greater detail below, the controller 190 is electronically and operably connected to the stator 150, in particular the windings 154, and is configured to control a current flowing through the windings 154 of the stator 150 so as to control movement of the annular ring 114 via interaction between the magnetic field created by the current and the magnets 146 to thereby control rotation of the vanes 132 about their first pitch axes 132P. In some embodiments, the controller 190 is configured to control the current in response to at least one of (i) at least one operating condition of the gas turbine engine, or (ii) at least one operating parameter of the at least one first vane.

A person skilled in the art will understand that variable vanes are more efficient than using bleed valves for obtaining the necessary transient surge margins of gas turbine engines such as the gas turbine engine 10 described above. Typically, variable vanes can introduce both weight and complexity to the engine 10. In order to minimize weight and complexity, a typical approach is to gang all variable vane stages together through a torque tube that is driven by a single hydraulic actuator. While effective and lightweight, this approach can introduce compromises to the optimum vane angle position for each stage and each phase of flight which results in both reduced efficiency and reduced surge margins. The difference between the achievable vane angles and the aerodynamically optimized positions can be 5 degrees or more. Tolerance stack-ups and wear contribute further deviations from the design intent. The forces and kinematics also introduce vane angle deviations depending on if it is an acceleration or deceleration. Although other approaches aim to use a separate actuator for each stage in order to address these issues, the weight of this solution is typically too high to be viable for a flight engine. Cam plates are another potential solution, but they can still suffer compromises from using a ganged, single actuator approach.

The assemblies described herein, including the vane assembly 110 (as well as the additional assemblies 210, 310, 410, 510 described below although not specifically addressed in the forthcoming paragraphs), utilize an annular ring 114 having a large diameter due to being mounted on the external casing 24. This brings about several benefits for the sizing of a lightweight electric motor assembly 140 for each stage. The force required to move the annular ring 114 is dictated by the aerodynamic loading on the particular plurality of vanes 130 of the stage being actuated, the range the vanes 132 have to be actuated over, the mechanical arrangement of the system including the number of actuator arms 126, and the frictional forces involved. The torque required by the electric motor assembly 140 may be determined by Equation 1 below.

$$\text{Torque}=\text{Force}\times r \tag{1}$$

The sizing of the electric motor assembly 140 must be taken into account as well. Sizing equations for an electric motor assembly 140 as described herein are summarized in Equation 2 below.

$$\frac{\text{Power}}{\text{speed}}=\varepsilon_r*\text{Length}*\text{diameter}^3 \text{ or } \frac{\text{Power}}{\text{speed}}=\varepsilon_r*\text{Length}*\text{diameter}^2 \tag{2}$$

Substituting Power=Torque*speed, Equation 3 is created, as shown below.

$$\text{Torque}=E_r*\text{Length}*\text{diameter}^3 \text{ or } \text{Torque}=E_r*\text{Length}*\text{diameter}^2 \tag{3}$$

Based on these equations, it is apparent that the diameter of the electric motor assembly 140, in particular the annular ring 114, the rotor 144, and the stator 150, has a large effect on the amount of torque that a given size of electric motor assembly 140 can produce. Therefore, by making the entire large diameter annular ring 114 the actual rotor portion of the electric motor assembly 140, the electric motor assembly 140 can be made to be lightweight and usable on individual vane stages, thus enabling individual stage control. In addition, the annular ring 114 provides the structure and mounting for the rotor 144 so that its effective mass is lower than a conventional electric motor assembly.

By way of a non-limiting example, a torque/weight ratio of the electric motor assemblies described herein, including the electric motor assemblies 140, 240, 340, 440, 540, may be in a range of 70 N-m/kg to 90 N-m/kg, and in some embodiments, in a range of 75 N-m/kg to 85 N-m/kg, and in some embodiments, approximately 80 N-m/kg. By way of a further non-limiting example, assuming a torque value of approximately 450 N-m is required, then the motor mass, in particular the mass of the electric motor assembly 140, would be approximately 5.6 kg or 12.3 lb.

In some embodiments, the sizing of the electric motor assembly 140 components, such as the rotor 144 and the stator 150, or the number of magnets 146 and windings 154 utilized, can be tailored for specific stages of the engine 10. By way of a non-limiting example, in a low torque stage such as an inlet guide vane section, the torque, and hence the electric motor assembly 140 mass could be significantly lower, and moreover, less magnets 146 and windings 154 can be utilized. For example, less magnets 146 and windings 154 may be utilized in an inlet guide vane section of the engine 10 versus a compressor section 13 or turbine section 17 of the engine 10. In some embodiments, spring-loaded offsets or other mechanisms may reduce the peak torque requirement and therefore the motor mass as well.

As described above, a controller 190 is electronically and operably connected to the electric motor assembly 140, in particular to the stator 150, in order to control a current flowing through the windings 154 of the stator 150. The controller 190 may include at least one processor connected to a computer readable memory and/or other data storage. Computer executable instructions and data used by a processor may be stored in the computer readable memory included in an onboard computing device, a remote server, a combination of both, or implemented with any combination of read only memory modules or random access memory modules, optionally including both volatile and nonvolatile memory.

In some embodiments, the controller 190 may be connected to a user interface such that a user can manually adjust the vanes 132 via the controller 190 controlling the current of the stator 150, or such that a user can set various schedules, or preset positions, for the vane 132 positions based on projected operating conditions of the engine 10 or operating parameters of the vanes.

In some embodiments, the controller 190 may be configured to automatically move the annular ring 114 via control of the current of the stator 150 based on the presence of predetermined or real-time operating characteristics. In some applications, variable stator vanes 132 are utilized to manage a discrepancy between airflow and aerodynamic rotor speed (also known as corrected speed) of the bladed rotor associated with the plurality of vanes within the compressor 13 that occurs between different operating conditions of the engine 10. The discrepancy between airflow and rotor speed creates non-optimal incidences, so that incidence is corrected by changing the vane 132 angle. Given these physics, a vane scheduling according to at least one embodiment will be "vane angle" versus "aerodynamic speed" (where aerodynamic speed is the rotor's mechanical speed divided by the square root of temperature ($N/\sqrt{T}$)).

By way of a non-limiting example, the controller 190 may be configured to adjust the vanes 132 to predetermined, scheduled rotational positions based on at least one operating condition of the engine 10. In some embodiments, the at least one operating condition can include at least one of altitude of the aircraft utilizing the engine 10, Mach number of the aircraft, power offtake requirements, engine power/throttle settings. In some embodiments, when certain predetermined operating condition limits are reached, the controller 190 may adjust the vanes 132 accordingly, while in other embodiments, the controller 190 may be configured to adjust such limits based on active, real-time conditions of the engine and/or active, real-time operating parameters of the vanes. By way of a non-limiting example, the Mach number of the aircraft or the altitude at which it is flying may result in a specific speed and mass flow of the air flowing through the engine 10 sections. In such scenarios, it may be beneficial to move certain stages of vanes to first rotational positions, while others to different, second rotational positions, so as to optimize air flow over corresponding bladed rotors and other engine components.

In some embodiments, the controller 190 may be configured to optimize vane angles of a stage or stages based on the current throttle conditions engine and current flight envelope of the aircraft, as well as to enable different stroke-ranges. In some embodiments, the schedule of the individual vane stages may be altered or updated by the controller 190 based on an operating mode of the engine 10, which may include, but are not limited to, such modes as high-efficiency cruise mode or rapid throttle mode.

By way of another non-limiting example, the controller 190 may be configured to adjust the vanes 132 to predetermined, scheduled rotational positions based on at least one current operating parameter of the vanes 132. For example, the at least one current operating parameter may include at least one of a current position of the vanes, current forces being applied to the vanes, current vibrations being experienced by the vanes, corresponding bladed rotor blades, pressures within corresponding sections of the engine, and tip timing. In some embodiments, the controller 190 may be preset with predefined limits of these operating parameters such that when the vanes or corresponding components reach these predefined limits, the controller 190 will control the current of the stator 150 so as to move the plurality of vanes 130 accordingly. In some embodiments, the controller 190 may actively, in real-time, determine limits of these operating parameters based on the current conditions of the engine 10, such as based on the current operating conditions described above. As a result, when the vanes or corresponding components reach these actively determined limits, the controller 190 will control the current of the stator 150 so as to move the plurality of vanes 130 accordingly.

As a further non-limiting example, the controller 190 may be configured to control a rate of rotation of the vanes 132, which may be based on operating conditions of the engine 10 and/or operating parameters of the vanes 132. The operating conditions of the engine 10 and/or operating parameters of the vanes 132 may include operating condition limits and/or operating parameter limits which the rate of rotation control is based on, these limits being either predetermined, measured and adjusted in real-time similarly to the manners described above, or a combination of both. By way of a non-limiting example, the axially forwardmost vane stage including a first plurality of vanes 130 described above may be rotated at a first rate of rotation via its corresponding annular ring 114, and the succeeding vane stage including a second plurality of vanes 130 may be rotated at a second rate of rotation via its corresponding annular ring 114, the first rate of rotation being different than the second rate of rotation. The various vane stages may each be rotated at unique rates of rotation, or some rates of rotation may overlap for multiple stages. Again, these configurations allow for unique, individual vane stage control.

In some embodiments, at least one sensor 194 positioned within the engine 10 and configured to take real-time measurements and provide the controller 190 with feedback, for example to be utilized in the measurement of current operating conditions and/or operating parameters of the engine 10 and vanes 132, as described above. The at least one sensor 194 may be configured to measure and provide real-time feedback to the controller 190 that includes current position of the vanes, current forces being applied to the vanes, current vibrations being experienced by the vanes, corresponding bladed rotor blades, pressures within corresponding sections of the engine, and tip timing. In some embodiments, a resolver 192 may be provided in proximity with the vane 132 in order to provide rotational position feedback, in particular by directing a laser at the vane 132, which may have a small strip having teeth or markers thereon, and determining how many of these teeth or markers have moved past the laser in order to determine a precise position of the vane 132. The resolver 192 can also determine rates of rotation of the vanes 132 in addition to rotational position.

The at least one sensor 194 may be further configured to provide force feedback in order to determine forces effecting the vanes 132 and the surrounding components, such as the inner and outer platforms, the actuator arms 126, the couplings 137, 138, the annular ring 114, and the like. Illustratively, sensors 194 may be arranged within each stage of vanes in order to determine forces occurring in each stage, such that the controller 190 may assess optimized vane positions for each stage based on the current forces. The sensors 194 may also be arranged to measure various forces occurring elsewhere in the engine 10 that may be relevant to vane 132 positioning.

In some embodiments, the controller 190 may be configured to preset and change, via user interaction or calculations executed by the controller 190, individual vane stage schedules based on the operating age of the engine 10. By way of a non-limiting example, the controller 190 may be configured to only open vane stages of a section that are further aft (i.e. stages V3, V4, V5 as shown in FIG. 2), instead of having all vane stages of that section open, which would maintain surge margin in aging engines 10. In some embodiments, the controller 190 may be configured to bias the vanes 132 based on deterioration of the engine 10.

In some embodiments, the controller 190 may be configured to perform a reset of the vane schedules of individual vane stages via user interaction or calculations executed by the controller 190. In some embodiments, the reset of the vane schedules may be executed in response to an aeromechanical issue identified by the at least one sensor 194 or other mechanisms in one or more vane stages. In some embodiments, the vane schedule may be altered or updated by the controller 190 in response to such undesirable aeromechanical issues identified by the at least one sensor 194, which may include but are not limited to, vibration sensors, high frequency pressure sensors, or tip timing sensors. Such alterations or updates may be executed in a one-time fashion based on issues detected during development testing, or later via real-time feedback from the at least one sensor 194. In some embodiments, the controller 190 is configured to update the vane stage schedules after the engine 10 is deployed (i.e. coupled to and operated along with an aircraft). In particular, for aircraft systems with closed loop controls, such updating of the vane stage schedules after deployment may appear like a gain change or an offset. For systems with fixed schedules (like many modern engines) such updating of the vane stage schedules after deployment may simply be new vane schedules based on learning or information from other similar engines, test vehicles, and/or engine age.

The various manners in which the controller 190 may control rotation of the vanes 132 via the actuation assembly 112 and electric motor assembly 140, as described herein and in relation to other embodiments such as the vane assemblies 210, 310, 410, 510, 610, provide numerous possibilities for engine control, optimization, and maintenance, thus improving performance, reducing upkeep costs, and increasing longevity. For example, the individually controllable stages of vanes remove potential single points of failure, or in other words, failure of a single components of a vane stage does not affect the other vane stages. Moreover, such individually controllable vane stage assemblies provide for compatible architecture that may be interchangeable between engine designs. Furthermore, such individually controllable vane stage assemblies provide a lightweight design that also improves specific fuel consumption via the optimization of variable vane positions as described herein.

Figure 5B:
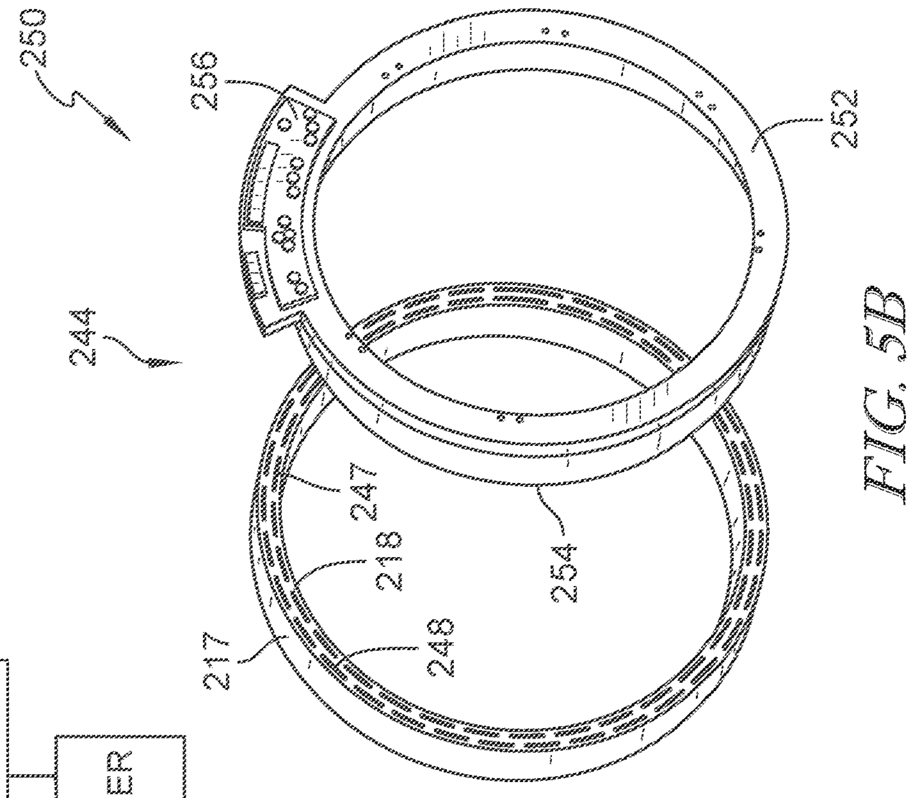
FIG. 5B is a perspective view of the stator and rotor of the electric motor assembly of FIG. 5A.
Figure 5A:
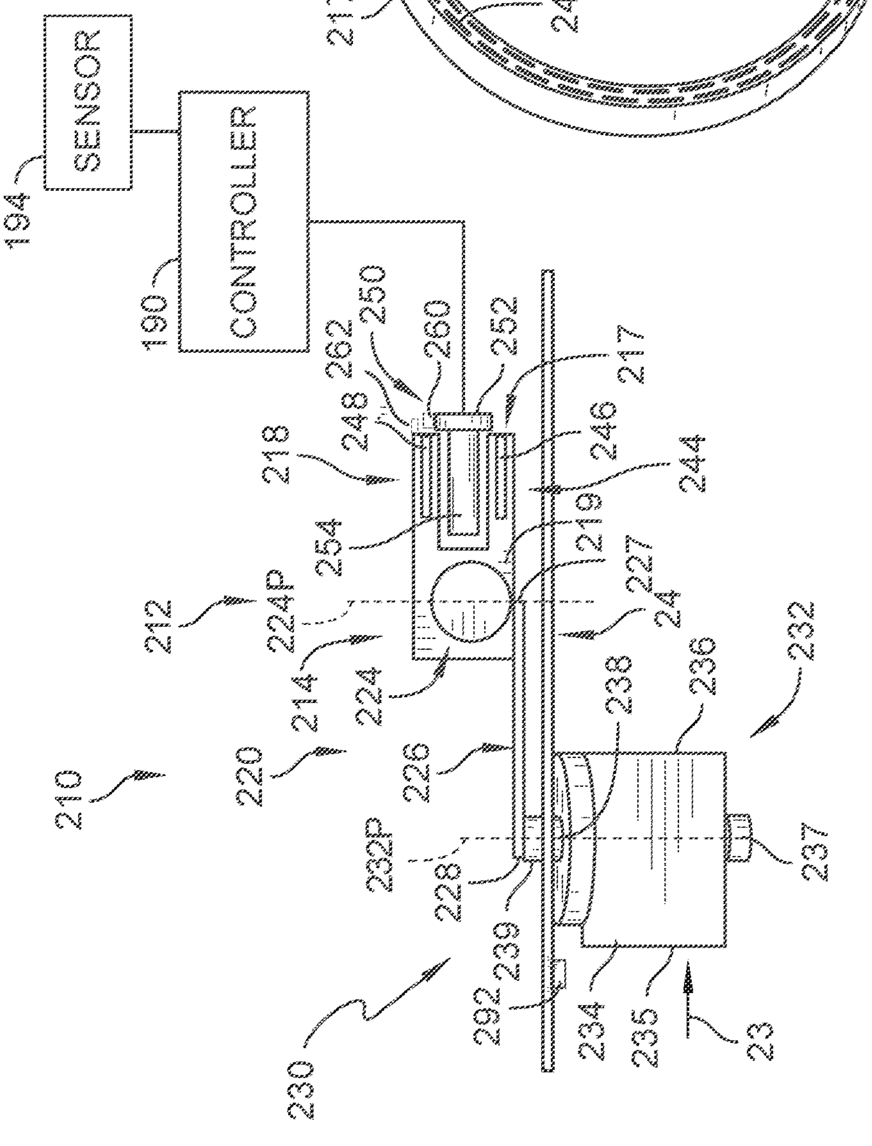
FIG. 5A is a cross-sectional view of a vane assembly according to a further aspect of the present disclosure, showing that the vane assembly includes a plurality of variable vanes and an electric motor assembly including a rotor arranged to move annularly with an annular ring surrounding the plurality of vanes and a stator, showing that the rotor includes a first plurality of magnets and a second plurality of magnets radially spaced apart from each other, showing that the annular ring is coupled to the plurality of vanes, showing that the stator is configured to annularly move the annular ring which rotates each variable vane of the plurality of vanes, and showing that the stator is axially aligned with the rotor and arranged radially between the first plurality of magnets and the second plurality of magnets.

Another embodiment of a vane assembly 210 that is configured to be utilized in the gas turbine engine 10 is shown in FIGS. 5A and 5B. The vane assembly 210 is similar to the vane assembly 110 described herein. Accordingly, similar reference numbers in the 200 series indicate features that are common between the vane assembly 210 and the vane assembly 110. The description of the vane assembly 110 is incorporated by reference to apply to the vane assembly 210, except in instances when it conflicts with the specific description and the drawings of the vane assembly 210.

As can be seen in FIG. 5A and FIG. 5B, the vane assembly 210 includes similar components to the vane assembly 110, in particular the components of the annular ring 214, the components of the actuator coupling assembly 220, and the components of the plurality of vanes 230. The vane assembly 210 differs from the vane assembly 110 in that the first actuator assembly 212 further includes the electric motor assembly 240 which, as can be seen in FIG. 5A and FIG. 5B, includes two sets of magnets 246, 248 arranged on opposing radial sides of the stator 250.

Specifically, the electric motor assembly 240 includes a rotor 244 and a stator 250 arranged in proximity to the annular ring 214 and configured to electromagnetically interact with each other so as to annularly move the annular ring 214. Illustratively, the rotor 244 includes at least one first magnet 246 arranged within a first axial extension, or first platform extension 217 of the annular ring 214, and at least one second magnet 248 arranged within a second axial extension, or second platform extension 218 of the annular ring 214. The first platform extension 217 extends axially away from a radially inner side of the annular ring 214, and the second platform extension 217 extends axially away from a radially outer side of the annular ring 214, as shown in FIG. 5A. in some embodiments, the platforms 217, 218 are arranged within hollowed out sections of the annular ring 214 that allow the platforms 217, 218 to be arranged axially away from a main portion 219 of the annular ring 214 while remaining housed within the interior cavity 216 of the ring 214. The platforms 217, 218 are fixed to the outer housing wall 215 of the annular ring 214 so as to move therewith.

In some embodiments, the rotor 244 may include a single magnet 246, or, as shown in FIG. 5B, a plurality of magnets 246 evenly arranged around the platforms 217, 218. In other embodiments, the rotor 244 may include groups of magnets 246 arranged in sections around the annular extent of the platforms 217, 218. By way of a non-limiting example, a group of magnets 246 may be arranged at each 90 degree position around the platforms 217, 218. By way of another non-limiting example, a group of magnets 246 may be arranged at opposing 180 degree positions of the platforms 217, 218. Such arrangements may be utilized to further reduce the weight of the assembly 210 and add redundancy.

The electric motor assembly 240 further includes the stator 250 spaced apart from the magnets 246, 248 of the rotor 244 and configured to electromagnetically interact with the magnets 246, 248 as shown in FIG. 5A. Illustratively, the stator 250 includes an annular stator platform 252 that includes an axially-facing main surface. The platform 252 may be slightly axially spaced apart and away from the rotor 244 such that at least one winding 254 of the stator 250, which is arranged on the axially-facing side of the annular stator platform 252, extends in between the first and second magnets 246, 248, as shown in FIG. 5A. The annular platform 252 may further include a partial side wall 256 for axial coupling to other components of the vane assembly 210 or engine 10.

In some embodiments, the stator 250 may include a single winding 254 arranged on the platform 252, or, as shown in FIG. 5B, a plurality of windings 254 evenly arranged around the platform 252. In other embodiments, the stator 250 may include groups of windings 254 arranged in sections around the annular extent of the platform 252. By way of a non-limiting example, a group of windings 254 may be arranged at each 90 degree position around the platform 252 so as to generally align with corresponding groups of magnets 246, 248, as described above. By way of another non-limiting example, a group of windings 254 may be arranged at opposing 180 degree positions of the platform 252 so as to generally align with corresponding groups of magnets 246, 248, as described above. Such arrangements may be utilized to further reduce the weight of the assembly 210 and add redundancy. Illustratively, the stator 250 is also radially aligned with the annular ring 214, as shown in FIG. 5A.

In the illustrative embodiment, the annular stator platform 252 is axially offset from the magnets 246, 248 and the plurality of windings 254 are axially aligned with the magnets 246, 248 as shown in FIG. 5A. In some embodiments, the axial extent of the plurality of windings 254 is greater than the axial extent of the corresponding magnets 246, 248 so as to account for small axial movements of the annular ring 214 during annular movement thereof. In some embodiments, the first magnets 246 and the second magnets 248 are axially aligned with each other on opposing radial sides of the windings 254.

In operation, the stator 250, in particular the windings 254 of the stator 250, are configured to create a magnetic field which causes annular movement of the annular ring 214 via interaction with the magnets 246, 248. During annular movement, the annular ring 214 moves relative to the vane pitch axis 232P, which is fixed relative to the casing 24 via the couplings 237, 238, such that the annular movement of the annular ring 214 causes rotation of the vanes 232 about their respective vane pitch axes 232P. In some embodiments, the stator 250, and thus movement of the annular ring 214, is controlled via the controller 190 described above. A person skilled in the art will understand that all description of the controller 190 and its interaction with the stator 150 of the vane assembly 110 is applicable to the vane assembly 210 described herein.

In some embodiments, the stator platform 252 may further include a locking plunger 260 attached thereto, as shown in FIG. 5A. The locking plunger 260 may be actuated by any mechanisms known in the art, such as via a solenoid, to lower and engage a set of teeth 262 that extend around the circumference of an outer surface of the annular ring 214. When the plunger 260 engages the teeth 262 (see FIG. 4C for further details regarding this engagement), the annular ring 214, and thus the vanes 232, are locked in place, thus eliminating the stress on the annular ring 214 and the components of the electric motor assembly 240 as well as the actuator coupling assembly 220 that would be caused by having to hold the vanes 232 and the annular ring 214 in place. Moreover, continuous power and current would not have to be applied to the stator 250 in order to hold these positions. The locking plunger 260 may be connected to the controller 190, which can control the locking and unlocking operations when the vanes 232 are in desired positions. In other related embodiments, the electric motor assembly 240 may include, in addition to or alternatively to the locking plunger 260, a friction brake that engages the annular ring 214 to slow or stop movement of the ring 214.

Figure 6B:
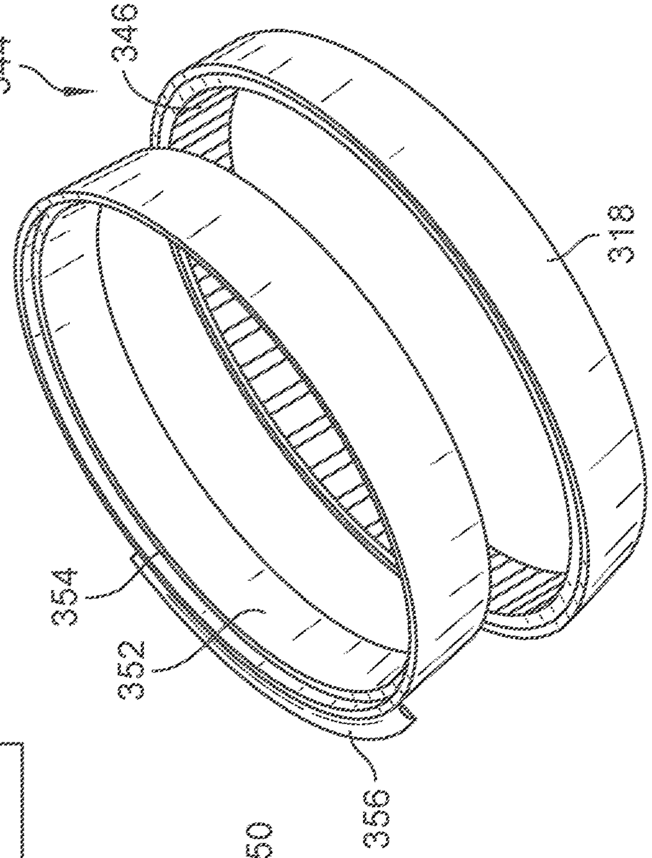
FIG. 6B is a perspective view of the stator and rotor of the electric motor assembly of FIG. 6A.
Figure 6A:
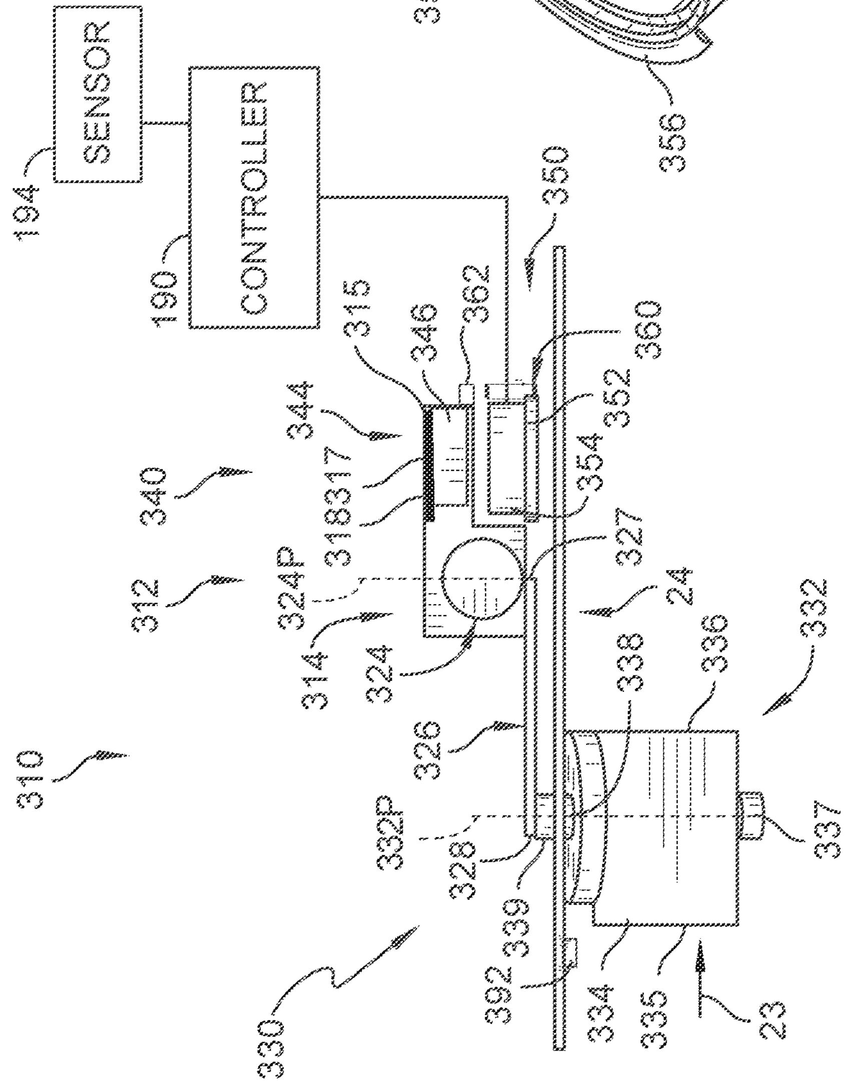
FIG. 6A is a cross-sectional view of a vane assembly according to a further aspect of the present disclosure, showing that the vane assembly includes a plurality of variable vanes and an electric motor assembly including a rotor arranged to move annularly with an annular ring surrounding the plurality of vanes and a stator, showing that the annular ring is coupled to the plurality of vanes, showing that the stator is configured to annularly move the annular ring which rotates each variable vane of the plurality of vanes, and showing that the stator is axially aligned with the rotor, is arranged radially inward of the rotor, and is generally radially aligned with the annular ring.

Another embodiment of a vane assembly 310 that is configured to be utilized in the gas turbine engine 10 is shown in FIGS. 6A and 6B. The vane assembly 310 is similar to the vane assemblies 110, 210 described herein. Accordingly, similar reference numbers in the 300 series indicate features that are common between the vane assembly 310 and the vane assemblies 110, 210. The descriptions of the vane assemblies 110, 210 are incorporated by reference to apply to the vane assembly 310, except in instances when they conflict with the specific description and the drawings of the vane assembly 310.

As can be seen in FIG. 6A and FIG. 6B, the vane assembly 310 includes similar components to the vane assemblies 110, 210, in particular the components of the annular ring 314, the components of the actuator coupling assembly 320, and the components of the plurality of vanes 330. The vane assembly 310 differs from the vane assemblies 110, 210 in that the first actuator assembly 312 further includes the electric motor assembly 340 which, as can be seen in FIG. 6A and FIG. 6B, includes the rotor 344 arranged on a radially outer side of the stator 350, and the stator 350 being generally radially aligned with the body of the annular ring 314.

Specifically, the electric motor assembly 340 includes a rotor 344 and a stator 350 arranged in proximity to the annular ring 314 and configured to electromagnetically interact with each other so as to annularly move the annular ring 314. Illustratively, the rotor 344 includes at least one first magnet 346 arranged on an annular platform 318 that extends around the interior cavity 316 of the ring 314, the magnet 346 extending radially outwardly away from the platform 318. The platform 318 is fixed to the outer housing wall 315 of the annular ring 314 so as to move therewith.

In some embodiments, the rotor 344 may include a single magnet 346, or, as shown in FIG. 6B, a plurality of magnets 346 evenly arranged around the platform 318. In other embodiments, the rotor 344 may include groups of magnets 346 arranged in sections around the annular extent of the platform 318. By way of a non-limiting example, a group of magnets 346 may be arranged at each 90 degree position around the platform 318. By way of another non-limiting example, a group of magnets 346 may be arranged at opposing 180 degree positions of the platform 318. Such arrangements may be utilized to further reduce the weight of the assembly 310 and add redundancy.

The electric motor assembly 340 further includes the stator 350 spaced apart from the magnets 346 of the rotor 344 and configured to electromagnetically interact with the magnets 346 as shown in FIG. 6A. Illustratively, the stator 350 includes an annular stator platform 352 and at least one winding 354 arranged on a radially outer side of the annular stator platform 352, as shown in FIG. 6B. The annular platform 352 may further include a partial side wall 356 for axial coupling to other components of the vane assembly 310 or engine 10.

In some embodiments, the stator 350 may include a single winding 354 arranged on the platform 352, or, as shown in FIG. 6B, a plurality of windings 354 evenly arranged around the platform 352. In other embodiments, the stator 350 may include groups of windings 354 arranged in sections around the annular extent of the platform 352. By way of a non-limiting example, a group of windings 354 may be arranged at each 90 degree position around the platform 352 so as to generally align with corresponding groups of magnets 346, as described above. By way of another non-limiting example, a group of windings 354 may be arranged at opposing 180 degree positions of the platform 352 so as to generally align with corresponding groups of magnets 346, as described above. Such arrangements may be utilized to further reduce the weight of the assembly 310 and add redundancy. Illustratively, the windings 354 of the stator 350 are also radially aligned with the annular ring 314, in particular such that a radially inner surface of the windings 354 is radially aligned with a radially inner surface of the annular ring 314, as shown in FIG. 6A.

In the illustrative embodiment, the plurality of windings 354 are axially aligned with the magnets 346 as shown in FIG. 6A. In some embodiments, the axial extent of the plurality of windings 354 is greater than the axial extent of the corresponding magnets 346 so as to account for small axial movements of the annular ring 314 during annular movement thereof. As shown in FIG. 6A, the platform 318 is arranged within hollowed out section 317 of the annular ring 314 that extends axially from a radially outer side of the ring 314 so as to allow the platform 318 to remain housed within the interior cavity 316 of the ring 314 while also being located radially outward of the stator 350.

In operation, the stator 350, in particular the windings 354 of the stator 350, are configured to create a magnetic field which causes annular movement of the annular ring 314 via interaction with the magnets 346. During annular movement, the annular ring 314 moves relative to the vane pitch axis 332P, which is fixed relative to the casing 24 via the couplings 337, 338, such that the annular movement of the annular ring 314 causes rotation of the vanes 332 about their respective vane pitch axes 332P. In some embodiments, the stator 350, and thus movement of the annular ring 314, is controlled via the controller 190 described above. A person skilled in the art will understand that all description of the controller 190 and its interaction with the stator 150 of the vane assembly 110 is applicable to the vane assembly 310 described herein.

In some embodiments, the stator platform 352 may further include a locking plunger 360 attached thereto, as shown in FIG. 6A. The locking plunger 360 may be actuated by any mechanisms known in the art, such as via a solenoid, to lower and engage a set of teeth 362 that extend around the circumference of an outer surface of the annular ring 314. When the plunger 360 engages the teeth 362, the annular ring 314, and thus the vanes 332, are locked in place, thus eliminating the stress on the annular ring 314 and the components of the electric motor assembly 340 as well as the actuator coupling assembly 320 that would be caused by having to hold the vanes 332 and the annular ring 314 in place. Moreover, continuous power and current would not have to be applied to the stator 350 in order to hold these positions. The locking plunger 360 may be connected to the controller 190, which can control the locking and unlocking operations when the vanes 332 are in desired positions. In other related embodiments, the electric motor assembly 340 may include, in addition to or alternatively to the locking plunger 360, a friction brake that engages the annular ring 314 to slow or stop movement of the ring 314.

Figure 7B:
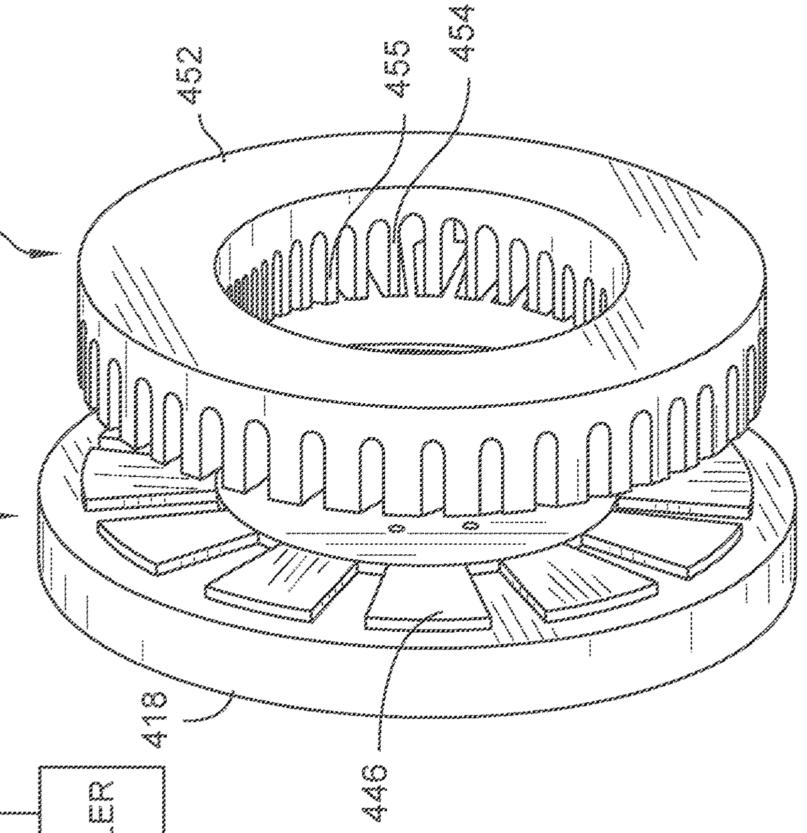
FIG. 7B is a perspective view of the stator and rotor of the electric motor assembly of FIG. 7A.
Figure 7A:
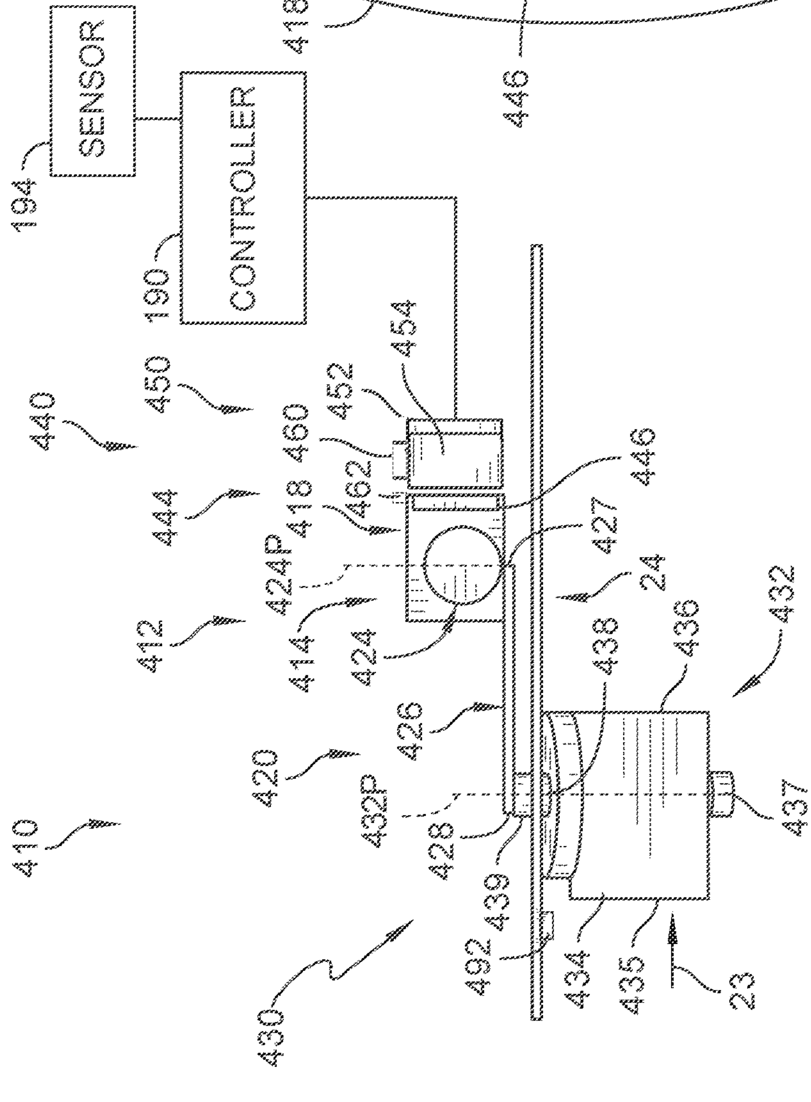
FIG. 7A is a cross-sectional view of a vane assembly according to a further aspect of the present disclosure, showing that the vane assembly includes a plurality of variable vanes and an electric motor assembly including a rotor arranged to move annularly with an annular ring surrounding the plurality of vanes and a stator, showing that the annular ring is coupled to the plurality of vanes, showing that the stator is configured to annularly move the annular ring which rotates each variable vane of the plurality of vanes, and showing that the stator is radially aligned with the rotor and axially spaced apart from the rotor in an aft direction.

Another embodiment of a vane assembly 410 that is configured to be utilized in the gas turbine engine 10 is shown in FIGS. 7A and 7B. The vane assembly 410 is similar to the vane assemblies 110, 210, 310 described herein. Accordingly, similar reference numbers in the 400 series indicate features that are common between the vane assembly 410 and the vane assemblies 110, 210, 310. The descriptions of the vane assemblies 110, 210, 310 are incorporated by reference to apply to the vane assembly 410, except in instances when they conflict with the specific description and the drawings of the vane assembly 410.

As can be seen in FIG. 7A and FIG. 7B, the vane assembly 410 includes similar components to the vane assemblies 110, 210, 310 in particular the components of the annular ring 414, the components of the actuator coupling assembly 420, and the components of the plurality of vanes 430. The vane assembly 410 differs from the vane assemblies 110, 210, 310 in that the first actuator assembly 412 further includes the electric motor assembly 440 which, as can be seen in FIG. 7A and FIG. 7B, includes the stator 450 arranged on an axially aft side of the rotor 444, and the stator 450 being generally radially aligned with the body of the annular ring 414.

Specifically, the electric motor assembly 440 includes a rotor 444 and a stator 450 arranged in proximity to the annular ring 414 and configured to electromagnetically interact with each other so as to annularly move the annular ring 414. Illustratively, the rotor 444 includes at least one first magnet 446 arranged within an axially aft portion 418 of the interior cavity 416 of the ring 414, axially spaced apart in the aft direction from the spherical bearing 324. The magnet 446 is fixed to the annular ring 414 so as to move therewith.

In some embodiments, the rotor 444 may include a single magnet 446, or, as shown in FIG. 7B, a plurality of magnets 446 evenly arranged around the ring 414. In other embodiments, the rotor 444 may include groups of magnets 446 arranged in sections around the annular extent of the ring 414. By way of a non-limiting example, a group of magnets 446 may be arranged at each 90 degree position around the ring 414. By way of another non-limiting example, a group of magnets 446 may be arranged at opposing 180 degree positions of the ring 414. Such arrangements may be utilized to further reduce the weight of the assembly 410 and add redundancy.

The electric motor assembly 440 further includes the stator 450 spaced apart from the magnets 446 of the rotor 444 and configured to electromagnetically interact with the magnets 446 as shown in FIG. 7A. Illustratively, the stator 450 includes an annular stator platform 452 and at least one winding 454 arranged on an axially forward-facing side of the annular stator platform 452, as shown in FIG. 7B. In some embodiments, coils of wire that comprise the windings 454 may be wound around slot teeth 455 arranged about a circumference of the platform 452 and extending away from the platform 452, as also shown in FIG. 7B.

In some embodiments, the stator 450 may include a single winding 454 arranged on a slot tooth 455 on the platform 452, or, as shown in FIG. 7B, a plurality of windings 454 evenly arranged on a plurality of slot teeth 455 around the platform 452. In other embodiments, the stator 450 may include groups of windings 454 arranged in sections around the annular extent of the platform 452. By way of a non-limiting example, a group of windings 454 may be arranged at each 90 degree position around the platform 452 so as to generally align with corresponding groups of magnets 446, as described above. By way of another non-limiting example, a group of windings 454 may be arranged at opposing 180 degree positions of the platform 452 so as to generally align with corresponding groups of magnets 446, as described above. Such arrangements may be utilized to further reduce the weight of the assembly 410 and add redundancy. Illustratively, the windings 454 of the stator 450 are also radially aligned with the annular ring 414, in particular such that a radially inner surface of the windings 454 is radially aligned with a radially inner surface of the annular ring 414, as shown in FIG. 7A. Moreover, a radially outer surface of the windings 454 is radially aligned with a radially outer surface of the annular ring 414, as shown in FIG. 7A.

In the illustrative embodiment, the plurality of windings 454 are radially aligned with the magnets 446 as shown in FIG. 7A, in particular such that the magnets are radially centered with respect to the radial width of the windings 454. In some embodiments, the windings 454 may be slightly spaced apart from the axially aft surface of the ring 414 so as to account for small axial movements of the annular ring 414 during annular movement thereof.

In operation, the stator 450, in particular the windings 454 of the stator 450, are configured to create a magnetic field which causes annular movement of the annular ring 414 via interaction with the magnets 446. During annular movement, the annular ring 414 moves relative to the vane pitch axis 432P, which is fixed relative to the casing 24 via the couplings 437, 438, such that the annular movement of the annular ring 414 causes rotation of the vanes 432 about their respective vane pitch axes 432P. In some embodiments, the stator 450, and thus movement of the annular ring 414, is controlled via the controller 190 described above. A person skilled in the art will understand that all description of the controller 190 and its interaction with the stator 150 of the vane assembly 110 is applicable to the vane assembly 410 described herein.

In some embodiments, the stator platform 452 may further include a locking plunger 460 attached thereto, in particular on a radially outer side of the stator platform 452, as shown in FIG. 7A. The locking plunger 460 may be actuated by any mechanisms known in the art, such as via a solenoid, to lower and engage a set of teeth 462 that extend around the circumference of an outer surface of the annular ring 414. When the plunger 460 engages the teeth 462, the annular ring 414, and thus the vanes 432, are locked in place, thus eliminating the stress on the annular ring 414 and the components of the electric motor assembly 440 as well as the actuator coupling assembly 420 that would be caused by having to hold the vanes 432 and the annular ring 414 in place. Moreover, continuous power and current would not have to be applied to the stator 450 in order to hold these positions. The locking plunger 460 may be connected to the controller 190, which can control the locking and unlocking operations when the vanes 432 are in desired positions. In other related embodiments, the electric motor assembly 440 may include, in addition to or alternatively to the locking plunger 460, a friction brake that engages the annular ring 414 to slow or stop movement of the ring 414.

Figures 8A, 8B:
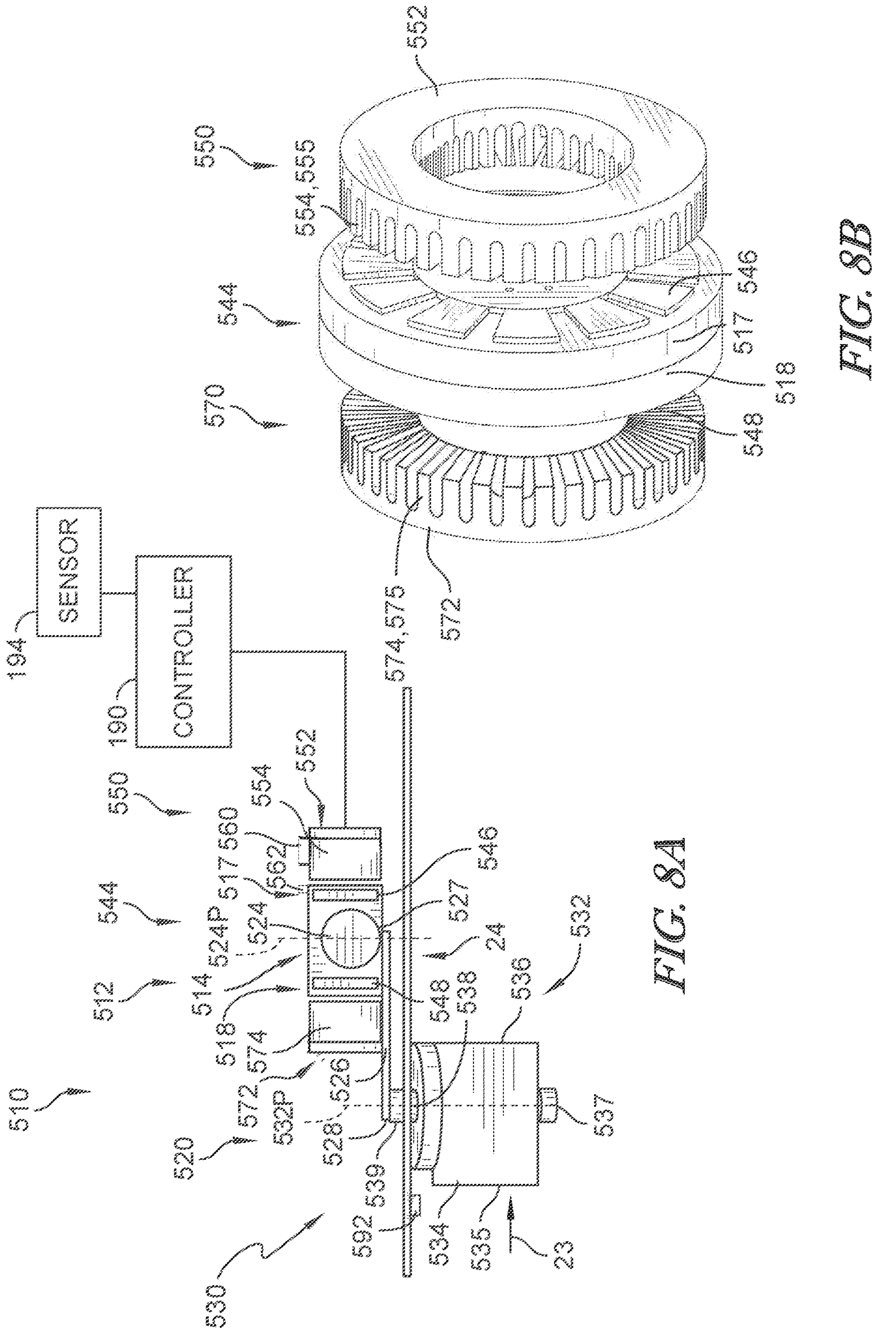
FIG. 8A is a cross-sectional view of a vane assembly according to a further aspect of the present disclosure, showing that the vane assembly includes a plurality of variable vanes and an electric motor assembly including a rotor arranged to move annularly with an annular ring surrounding the plurality of vanes and two stators, showing that the annular ring is coupled to the plurality of vanes, showing that the two stators are configured to annularly move the annular ring which rotates each variable vane of the plurality of vanes, showing that the stators are radially aligned with the rotor and that a first stator is axially spaced apart from the rotor in a forward direction and a second stator is axially spaced apart from the rotor in an aft direction, and showing that the rotor includes two pluralities of magnets arranged proximate to respective stators.
FIG. 8B is a perspective view of the stator and rotor of the electric motor assembly of FIG. 8A.

Another embodiment of a vane assembly 510 that is configured to be utilized in the gas turbine engine 10 is shown in FIGS. 8A and 8B. The vane assembly 510 is similar to the vane assemblies 110, 210, 310, 410 described herein. Accordingly, similar reference numbers in the 500 series indicate features that are common between the vane assembly 510 and the vane assemblies 110, 210, 310, 410. The descriptions of the vane assemblies 110, 210, 310, 410 are incorporated by reference to apply to the vane assembly 510, except in instances when they conflict with the specific description and the drawings of the vane assembly 510.

As can be seen in FIG. 8A and FIG. 8B, the vane assembly 510 includes similar components to the vane assemblies 110, 210, 310, 410 in particular the components of the annular ring 514, the components of the actuator coupling assembly 520, and the components of the plurality of vanes 530. The vane assembly 510 differs from the vane assemblies 110, 210, 310, 410 in that the first actuator assembly 512 further includes the electric motor assembly 540 which, as can be seen in FIG. 8A and FIG. 8B, includes two stators 550, 570 arranged on opposing axial sides of the annular ring 514 and thus opposing axial sides of the rotor 544, and the stators 550, 570 being generally radially aligned with the body of the annular ring 514.

Specifically, the electric motor assembly 540 is formed similarly to the electric motor assembly 440, except in that an additional, or at least one second, magnet 548 is arranged opposite the first magnet 546, and in that the assembly 540 includes an addition, or second, stator 570 arranged opposite the first stator 550 axially forward of the annular ring 514. In particular, the assembly 540 includes a rotor 544 and two stators 550, 560 arranged in proximity to the annular ring 514 and configured to electromagnetically interact with each other so as to annularly move the annular ring 514. Illustratively, the rotor 544 includes at least one first magnet 546 and at least one second magnet 548, the first magnet 546 arranged within an axially aft portion 517 of the interior cavity 516 of the ring 514, and the second magnet 548 arranged within an axially forward portion 518 of the interior cavity 516 of the ring 514. The magnets 546, 548 are axially spaced apart from the spherical bearing 524. The magnets 546, 548 are fixed to the annular ring 514 so as to move therewith.

In some embodiments, the rotor 544 may include a single magnet for each the first and second magnets 546, 548 or, as shown in FIG. 8B, a plurality of magnets 546, 548 evenly arranged around the ring 514. In other embodiments, the rotor 544 may include groups of magnets 546, 548 arranged in sections around the annular extent of the ring 514. By way of a non-limiting example, a group of magnets 546, 548 may be arranged at each 90 degree position around the ring 514. By way of another non-limiting example, a group of magnets 546, 548 may be arranged at opposing 180 degree positions of the ring 514. Such arrangements may be utilized to further reduce the weight of the assembly 510 and add redundancy.

The electric motor assembly 540 further includes the first and second stators 550, 570 spaced apart from the magnets 546, 548 of the rotor 544 and configured to electromagnetically interact with the magnets 546, 548 as shown in FIG. 8A. Illustratively, the stators 550, 570 include annular stator platforms 552, 572 and at least one winding 554, 574. The windings 554 of the first stator 550 may be arranged on an axially forward-facing side of the annular stator platform 552, as shown in FIG. 8B, and the windings 574 of the second stator 570 may be arranged on an axially aft-facing side of the annular stator platform 572, as shown in FIG. 8B. In some embodiments, the coils of wire that comprise the windings 554, 574 may be wound around slot teeth 555, 575 arranged about a circumference of the platforms 552, 572 and extending away from the platforms 552, 572, as also shown in FIG. 8B.

In some embodiments, the stators 550, 570 may each include a single winding 554, 574 arranged on a respective slot tooth 555, 575 on the platform 552, 572, or, as shown in FIG. 8B, a plurality of windings 554, 574 evenly arranged on a plurality of slot teeth 555, 575 around the platform 552, 572. In other embodiments, the stators 550, 570 may include groups of windings 554, 574 arranged in sections around the annular extent of the platforms 552, 572. By way of a non-limiting example, a group of windings 554, 574 may be arranged at each 90 degree position around the platforms 552, 572 so as to generally align with corresponding groups of magnets 546, 548, as described above. By way of another non-limiting example, a group of windings 554, 574 may be arranged at opposing 180 degree positions of the platforms 552, 572 so as to generally align with corresponding groups of magnets 546, 548, as described above. Such arrangements may be utilized to further reduce the weight of the assembly 510 and add redundancy. Illustratively, the windings 554, 574 of the stators 550, 570 are also radially aligned with the annular ring 514, in particular such that radially inner surfaces of the windings 554, 574 are radially aligned with a radially inner surface of the annular ring 514, as shown in FIG. 8A. Moreover, radially outer surfaces of the windings 554, 574 are radially aligned with a radially outer surface of the annular ring 514, as shown in FIG. 8A.

In the illustrative embodiment, the plurality of windings 554, 574 are radially aligned with the magnets 546, 548 as shown in FIG. 8A in particular such that the magnets 546, 548 are radially centered with respect to the radial width of the windings 554, 574. In some embodiments, the windings 554, 574 may be slightly spaced apart from the axially aft and axially forward surfaces of the ring 514, respectively, so as to account for small axial movements of the annular ring 514 during annular movement thereof.

In operation, the stators 550, 570, in particular the windings 554, 574 of the stators 550, 570, are configured to create a magnetic field which causes annular movement of the annular ring 514 via interaction with the magnets 546, 548. During annular movement, the annular ring 514 moves relative to the vane pitch axis 532P, which is fixed relative to the casing 24 via the couplings 537, 538, such that the annular movement of the annular ring 514 causes rotation of the vanes 532 about their respective vane pitch axes 532P. In some embodiments, the stators 550, 570, and thus movement of the annular ring 514, is controlled via the controller 190 described above. A person skilled in the art will understand that all description of the controller 190 and its interaction with the stator 150 of the vane assembly 110 is applicable to the vane assembly 510 described herein.

In some embodiments, the stator platform 552 may further include a locking plunger 560 attached thereto, in particular on a radially outer side of the stator platform 552, as shown in FIG. 8A. The locking plunger 560 may be actuated by any mechanisms known in the art, such as via a solenoid, to lower and engage a set of teeth 562 that extend around the circumference of an outer surface of the annular ring 514. When the plunger 560 engages the teeth 562, the annular ring 514, and thus the vanes 532, are locked in place, thus eliminating the stress on the annular ring 514 and the components of the electric motor assembly 540 as well as the actuator coupling assembly 520 that would be caused by having to hold the vanes 532 and the annular ring 514 in place. Moreover, continuous power and current would not have to be applied to the stator 550 in order to hold these positions. The locking plunger 560 may be connected to the controller 190, which can control the locking and unlocking operations when the vanes 532 are in desired positions. In other related embodiments, the electric motor assembly 540 may include, in addition to or alternatively to the locking plunger 560, a friction brake that engages the annular ring 514 to slow or stop movement of the ring 514.

Figure 9:
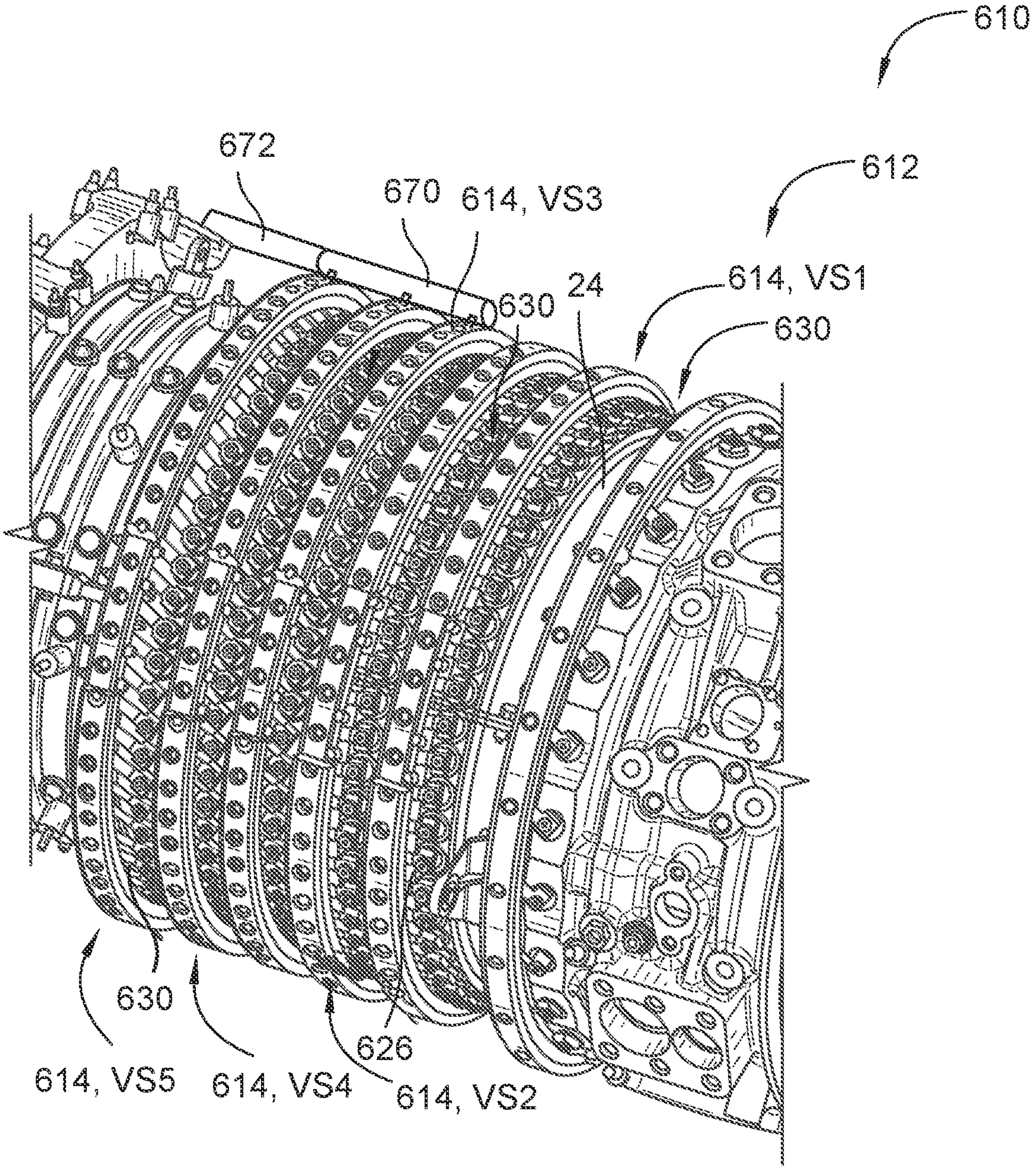
FIG. 9 is a perspective view of a compressor section of the engine of FIG. 1, showing that the engine includes multiple vane assemblies associated with adjacent vane stages of the compressor section, and showing that some vane stages are individually controllable via one or more of the vane assemblies described herein, while other vane stages are ganged via a torque tube so as to be uniformly controlled via the torque tube.

Another embodiment of a vane assembly 610 that is configured to be utilized in the gas turbine engine 10 is shown in FIG. 9. The vane assembly 610 is similar to the vane assemblies 110, 210, 310, 410, 510 described herein. Accordingly, similar reference numbers in the 600 series indicate features that are common between the vane assembly 610 and the vane assemblies 110, 210, 310, 410, 510. The descriptions of the vane assemblies 110, 210, 310, 410, 510 are incorporated by reference to apply to the vane assembly 610, except in instances when they conflict with the specific description and the drawings of the vane assembly 610.

As can be seen in FIG. 9, the vane assembly 610 includes similar components to the vane assemblies 110, 210, 310, 410, 510 in particular the components of the annular rings 614, the plurality of vanes 630, and electric motor assemblies that may be one or more of any of the motor assemblies 140, 240, 340, 440, 540 described above. The vane assembly 610 differs from the vane assemblies 110, 210, 310, 410, 510 in that some of the vane stages are individual controllable with an electric motor assembly 140, 240, 340, 440, 540, while other stages are ganged together and controllable via a torque tube 670. In one non-limiting example, the forwardmost two vane stages V1, V2 include an electric motor assembly 140, 240, 340, 440, 540 and are each individually controllable. The aftmost three vane stages V3, V4, V5 are ganged together via the torque tube 670, which is movable annularly via an actuator 372 so as to annularly move the annular rings 614 of the aftmost three vane stages V3, V4, V5. A person skilled in the art will understand that any combination of adjacent vane stages may be ganged together, and any additional vane stages may be individually controllable, as required by the design of the engine 10.

A method includes a first operation of providing a first plurality of vanes extending radially outward relative to a central axis of a gas turbine engine, each vane configured to rotate about a first vane pitch axis that extends radially relative to the central axis, a second operation of providing a first actuator assembly including a first annular ring, a first magnet, and a first stator, a third operation of arranging the first annular ring radially outward of the first plurality of vanes, and a fourth operation of coupling the first annular ring to at least one first vane of the first plurality of vanes.

The method further includes a fifth operation of arranging the first magnet on the first annular ring, and a sixth operation of arranging the first stator in spaced apart relation to the first magnet, the first stator configured to electromagnetically interact with the first magnet. The first annular ring is configured to rotate the at least one first vane about the corresponding first vane pitch axis in response to rotation of the first annular ring about the central axis and the first stator is configured to selectively rotate the first magnet and first annular ring about the central axis. The first stator is configured to create a magnetic field which causes annular movement of the first annular ring via interaction with the first magnet.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly for a gas turbine engine, the vane assembly comprising a casing surrounding a central axis of the gas turbine engine, a first plurality of vanes arranged within the casing and extending radially outward relative to the central axis, each vane being rotatably coupled to the casing for rotation relative thereto and configured to rotate about a first vane pitch axis that extends radially relative to the central axis, and a first actuator assembly arranged radially outward of the casing and including a first annular ring surrounding the casing and coupled to at least one first vane of the first plurality of vanes, the first annular ring including an outer housing having outer housing walls that define and enclose a hollow interior cavity therewithin, wherein the outer housing walls of the outer housing define a main portion that is hollow and a first axial extension that is hollow, wherein the main portion and the first axial extension together define the hollow interior cavity, a first magnet arranged within the first axial extension of the outer housing, and a first stator arranged outside of the outer housing walls of the outer housing and spaced apart from the first magnet, the first stator being configured to electromagnetically interact with the first magnet, wherein the first annular ring is configured to rotate the at least one first vane about the corresponding first vane pitch axis in response to rotation of the first annular ring about the central axis and the first stator is configured to selectively rotate the first magnet and first annular ring about the central axis, wherein the first stator is configured to create a magnetic field which causes annular movement of the first annular ring via interaction with the first magnet, and wherein the first stator includes a first stator platform axially spaced apart from the first annular ring and extending annularly around the central axis, wherein the first annular ring further includes a plurality of teeth arranged around a circumferential extent of the first annular ring, wherein the first stator further includes a locking plunger arranged on an outer circumferential surface of the first stator platform, and wherein the locking plunger is configured to selectively move in a radial direction toward the plurality of teeth of the first annular ring so as to selectively engage the plurality of teeth in order to hold the at least one first vane at a first rotational position without having to continuously apply current to the first stator.

2. The vane assembly according to claim 1, wherein the first annular ring is coaxial with the first plurality of vanes and extends entirely around the casing.

3. The vane assembly according to claim 2, wherein the first actuator assembly includes a plurality of first magnets which includes the first magnet.

4. The vane assembly according to claim 3, wherein the first stator is axially aligned with the plurality of first magnets.

5. The vane assembly according to claim 4, wherein an axial extent of the first stator is greater than an axial extent of each first magnet of the plurality of first magnets.

6. The vane assembly according to claim 5, wherein the first stator is arranged radially outward of the plurality of first magnets.

7. The vane assembly according to claim 5, wherein the first stator is arranged radially inward of the plurality of first magnets.

8. The vane assembly according to claim 5, wherein the first actuator assembly further includes a plurality of second magnets arranged radially inward and spaced apart from the plurality of first magnets, wherein the first stator is arranged radially between the plurality of first magnets and the plurality of second magnets, and wherein an axial extent of the first stator is greater than an axial extent of each second magnet of the plurality of second magnets.

9. The vane assembly of claim 1, further comprising:

a second plurality of vanes axially spaced apart from the first plurality of vanes and extending radially outward relative to a central axis of the gas turbine engine, each vane of the second plurality of vanes configured to rotate about a second vane pitch axis that extends radially relative to the central axis; and a second actuator assembly arranged radially outward of the casing and including a second annular ring surrounding the casing and coupled to at least one second vane of the second plurality of vanes, a second magnet arranged on the second annular ring, and a second stator arranged adjacent the second magnet and configured to electromagnetically interact with the second magnet, wherein the second annular ring is configured to rotate the at least one second vane about the corresponding second vane pitch axis in response to rotation of the second annular ring about the central axis and the second stator is configured to selectively rotate the second magnet and second annular ring about the central axis.

10. The vane assembly of claim 9, wherein the at least one first vane is configured to rotate to a first rotational position, and the at least one second vane is configured to rotate to a second rotational position.

11. The vane assembly of claim 10, wherein the second rotational position is different than the first rotational position.

12. The vane assembly according to claim 1, wherein the first magnet is arranged at an axially aft end of the first axial extension, wherein the hollow outer housing of the first annular ring further includes a second axial extension that is hollow, wherein the first axial extension extends away from a radially outer side of the main portion and the second axial extension is radially spaced apart from the first axial extension and extends away from a radially inner side of the main portion so as to define a recess of the annular ring therebetween, wherein the first actuator assembly further includes a second magnet arranged within the second axial extension, and wherein the first stator is arranged radially between the first magnet and the second magnet in the recess and outside of the hollow outer housing.

13. The vane assembly according to claim 1, wherein the first actuator assembly further includes a first actuator arm extending between and coupling the at least one first vane of the first plurality of vanes to the first annular ring, wherein the first actuator arm is rotatably coupled to the first annular ring, and wherein the first actuator assembly further includes a first spherical bearing coupled to a first end of the first actuator arm and rotatably arranged within the first annular ring such that rotation of the first annular ring about the central axis causes pivoting of the first actuator arm and thus rotation of the at least one first vane about the corresponding first vane pitch axis.

14. A vane assembly for a gas turbine engine, the vane assembly comprising a first plurality of vanes configured to each rotate about a first vane pitch axis, and a first actuator assembly including a first annular ring coupled to the first plurality of vanes, a first magnet arranged on the first annular ring, a second magnet arranged on the first annular ring radially inward and spaced apart from the first magnet, and a first stator spaced apart from the first magnet and the second magnet, wherein the first stator is arranged radially between the first magnet and the second magnet, wherein the first annular ring includes an outer housing having outer housing walls that define and enclose a hollow interior cavity therewithin, wherein the outer housing walls of the outer housing define a main portion that is hollow and a first axial extension that is hollow, wherein the main portion and the first axial extension together define the hollow interior cavity, and wherein the first magnet is arranged within the first axial extension of the outer housing, wherein the first annular ring is configured to rotate at least one first vane of the first plurality of vanes about the corresponding first vane pitch axis in response to rotation of the first annular ring about the central axis, wherein the first stator is configured to create a magnetic field which causes annular movement of the first annular ring via interaction with the first magnet, wherein a current is selectively applied to the first stator such that the first stator is configured to incrementally rotate the first magnet and the first annular ring about the central axis in both a first circumferential direction and a second circumferential direction opposite the first circumferential direction, and wherein the at least one first vane is configured to be incrementally rotated about the first vane pitch axis to distinct rotational positions via the incremental rotation of the first annular ring, and wherein the first stator includes a first stator platform axially spaced apart from the first annular ring and extending annularly around the central axis, wherein the first annular ring further includes a plurality of teeth arranged around a circumferential extent of the first annular ring, wherein the first stator further includes a locking plunger arranged on an outer circumferential surface of the first stator platform, and wherein the locking plunger is configured to selectively move in a radial direction toward the plurality of teeth of the first annular ring so as to selectively engage the plurality of teeth in order to hold the at least one first vane at a first rotational position without having to continuously apply current to the first stator.

15. The vane assembly according to claim 14, wherein the first stator is axially aligned with the first magnet.

16. A method, comprising providing a first plurality of vanes extending radially outward relative to a central axis of a gas turbine engine, each vane configured to rotate about a first vane pitch axis that extends radially relative to the central axis, providing a first actuator assembly including a first annular ring, a first magnet, and a first stator, arranging the first annular ring radially outward of the first plurality of vanes, the first annular ring including an outer housing having outer housing walls that define and enclose a hollow interior cavity therewithin, wherein the outer housing walls of the outer housing define a main portion that is hollow and a first axial extension that is hollow, wherein the main portion and the first axial extension together define the hollow interior cavity, coupling the first annular ring to at least one first vane of the first plurality of vanes, arranging the first magnet within the first axial extension of the outer housing, and arranging the first stator outside of the hollow outer housing of the annular ring and in spaced apart relation to the first magnet, the first stator configured to electromagnetically interact with the first magnet, wherein the first annular ring is configured to rotate the at least one first vane about the corresponding first vane pitch axis in response to rotation of the first annular ring about the central axis and the first stator is configured to selectively rotate the first magnet and first annular ring about the central axis, wherein the first stator is configured to create a magnetic field which causes annular movement of the first annular ring via interaction with the first magnet, and wherein the first stator includes a first stator platform axially spaced apart from the first annular ring and extending annularly around the central axis, wherein the first annular ring further includes a plurality of teeth arranged around a circumferential extent of the first annular ring, wherein the first stator further includes a locking plunger arranged on an outer circumferential surface of the first stator platform, and wherein the locking plunger is configured to selectively move in a radial direction toward the plurality of teeth of the first annular ring so as to selectively engage the plurality of teeth in order to hold the at least one first vane at a first rotational position without having to continuously apply current to the first stator.

* * * * *